(12) United States Patent
Hashimoto

(10) Patent No.: US 10,160,625 B2
(45) Date of Patent: Dec. 25, 2018

(54) CONVEYANCE SYSTEM AND CONVEYANCE METHOD OF CONVEYANCE SYSTEM

(71) Applicant: KAWASAKI JUKOGYO KABUSHIKI KAISHA, Kobe-shi, Hyogo (JP)

(72) Inventor: Yasuhiko Hashimoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 510 days.

(21) Appl. No.: 14/426,546

(22) PCT Filed: Sep. 6, 2013

(86) PCT No.: PCT/JP2013/005307
§ 371 (c)(1),
(2) Date: Mar. 6, 2015

(87) PCT Pub. No.: WO2014/038210
PCT Pub. Date: Mar. 13, 2014

(65) Prior Publication Data
US 2015/0266706 A1 Sep. 24, 2015

(30) Foreign Application Priority Data
Sep. 6, 2012 (JP) .................. 2012-196343

(51) Int. Cl.
| B66C 23/18 | (2006.01) |
| B25J 19/00 | (2006.01) |
| B66C 23/04 | (2006.01) |
| B25J 9/16 | (2006.01) |

(52) U.S. Cl.
CPC ............. *B66C 23/18* (2013.01); *B25J 9/1682* (2013.01); *B25J 19/0008* (2013.01); *B66C 23/04* (2013.01)

(58) Field of Classification Search
CPC ........ B66C 23/18; B66C 23/04; B25J 9/1682; B25J 19/0008
See application file for complete search history.

(56) References Cited

FOREIGN PATENT DOCUMENTS

| EP | 0 839 614 A1 | 5/1998 |
| EP | 2 308 656 A2 | 4/2011 |
| JP | H06-312386 A | 11/1994 |
| JP | H09-1492 A | 1/1997 |
| JP | 2006-501115 A | 1/2006 |
| JP | 2012-059456 A | 3/2012 |

OTHER PUBLICATIONS

Jun. 9, 2016 extended Search Report issued in European Patent Application No. 13835453.5.
Oct. 8, 2013 International Search Report issued in International Patent Application No. PCT/JP2013/005307.
Sep. 25, 2015 Office Action issued in Chinese Patent Application No. 201380041187.3.

*Primary Examiner* — Michael S Lowe
(74) *Attorney, Agent, or Firm* — Oliff PLC

(57) ABSTRACT

A conveyance system includes a robot and a suspending device. The robot moves and conveys a workpiece in a horizontal direction. The suspending device includes a suspending mechanism, a lifting unit, and a support mechanism. The suspending mechanism suspends the workpiece, and the lifting unit lifts up and down the workpiece. The support mechanism supports the suspending mechanism such that the suspending mechanism is movable in the horizontal direction.

10 Claims, 15 Drawing Sheets

CONVEYANCE SYSTEM AND CONVEYANCE METHOD OF CONVEYANCE SYSTEM

TECHNICAL FIELD

The present invention relates to a conveyance system configured to convey a workpiece and a conveyance method of the conveyance system.

BACKGROUND ART

Examples of workpieces conveyed in manufacturing factories and the like include metal molds for manufacturing metal parts, materials before molding of the metal parts, and the metal parts. Some of these workpieces have weights of several hundred kilograms to several tons. Such a heavy workpiece is conveyed to a predetermined position in such a manner that the heavy workpiece is suspended by, for example, a crane installed in a factory and is then moved by a worker in a horizontal direction. In a case where the worker performs operations of moving and stopping such a heavy load, the heavy workpiece may hit an inner wall, a device, and the like in the factory, and this may damage the heavy workpiece, the inner wall, the device, and the like.

To solve this problem, the heavy workpiece may be conveyed by using a large robot. In the conveyance operation, the heavy workpiece needs to be conveyed to the predetermined position with a high degree of accuracy. To satisfy this need, it is necessary to use a large robot including a highly stiff arm. However, if the highly-stiff arm is adopted, the manufacturing cost of the large robot becomes extremely high. The operation of lifting up the heavy load is hardly performed in the factory. Therefore, installing the large robot including the highly-stiff arm is difficult in terms of cost. Known as a conveyance system that solves such a cost problem is a conveyance system described in PTL 1.

The conveyance system of PTL 1 includes a balancer and a robot. A holding portion that holds the heavy workpiece is provided at a tip end portion of the balancer. A seat is formed at the tip end portion of the balancer, and the robot holds the seat to move the holding portion of the balancer to the predetermined position. A balance weight is attached to the balancer, and the load on the robot is reduced by the balance between the weight of the heavy workpiece and the balance weight.

CITATION LIST

Patent Literature

PTL 1: Japanese Laid-Open Patent Application Publication No. 9-1492

SUMMARY OF INVENTION

Technical Problem

The conveyance system of PTL 1 just keeps the balance between the weight of the heavy workpiece and the balance weight. Therefore, an applied load acting on the robot fluctuates depending on the posture of the balancer, the height of the heavy workpiece, and the like. On this account, when lifting up and down the heavy workpiece, the large applied load may act on the robot depending on the posture of the balancer, the height of the heavy workpiece, and the like. Therefore, in the conveyance system of PTL 1, the stiffness of the arm needs to be increased such that the robot can endure the applied load from the heavy workpiece.

Here, an object of the present invention is to provide a conveyance system capable of reducing an applied load acting on a conveyance robot when lifting up and down a workpiece.

Solution to Problem

A conveyance system of the present invention is a conveyance system including: a conveyance robot configured to move and convey a workpiece in a horizontal direction; and a suspending device including a suspending mechanism configured to suspend the workpiece, a lifting unit configured to lift up and down the workpiece suspended by the suspending mechanism, and a support mechanism configured to support the suspending mechanism such that the suspending mechanism is movable in the horizontal direction.

According to the present invention, the suspending device can lift up and down the workpiece, suspended by the suspending mechanism, by the lifting unit. In addition, the conveyance robot can move the workpiece in the horizontal direction together with the suspending mechanism. Therefore, lifting up and down the workpiece during the conveyance of the workpiece can be supported by the suspending device. Thus, the applied load acting on the conveyance robot can be reduced.

In the above invention, the conveyance system may further include: a first controller configured to control a lifting operation of the workpiece by the lifting unit of the suspending device; and a second controller configured to control a conveyance operation of the workpiece by the conveyance robot, wherein: the conveyance robot may include a guide part configured to guide the workpiece and move the guide part in the horizontal direction and an upper-lower direction to convey the workpiece; and the first controller and the second controller may cause the lifting operation of the workpiece by the lifting unit and the upper-lower movement operation of the guide part by the conveyance robot to be synchronized with each other.

According to the above configuration, since the upper-lower movement operation of the guide part by the conveyance robot and the lifting operation of the workpiece by the lifting unit are synchronized with each other, the guide part and the workpiece can be integrally lifted up and down. With this, it is possible to prevent a case where the guide portion and the workpiece move separately, and this causes an unnecessary applied load to act on the conveyance robot.

In the above invention, the conveyance system may be configured such that the first controller executes the lifting operation of the workpiece by the lifting unit in synchronization with the upper-lower movement operation of the guide part by the conveyance robot.

According to the above configuration, synchronizing the upper-lower movement operation of the guide part by the conveyance robot and the lifting operation of the workpiece by the lifting unit can be realized.

In the above invention, the conveyance system may be configured such that the second controller executes the upper-lower movement operation of the guide part by the conveyance robot in synchronization with the lifting operation of the workpiece by the lifting unit.

According to the above configuration, synchronizing the upper-lower movement operation of the guide part by the conveyance robot and the lifting operation of the workpiece by the lifting unit can be realized.

In the above invention, the conveyance system may be configured such that the second controller controls the conveyance operation of the workpiece by the conveyance robot by executing a compliance control operation in which compliance with respect to an upper-lower movement of the guide part is set to be low, and compliance with respect to a horizontal movement of the guide part is set to be high.

According to the above configuration, since the compliance with respect to the horizontal movement of the guide part is set to be high, the conveyance accuracy of the workpiece in the horizontal direction can be increased. In contrast, the compliance with respect to the upper-lower movement of the guide part is set to be low. Therefore, even if an upper-lower interfering force generated due to the lifting operation of the suspending device acts on the conveyance robot, the conveyance robot can be prevented from being damaged or breaking.

In the above invention, the conveyance system may be configured to further include: a first controller configured to control a lifting operation of the workpiece by the lifting unit of the suspending device; and a weight detector configured to detect a weight of the suspended workpiece, wherein the first controller may store a static weight of the suspended workpiece and control the lifting operation of the workpiece such that the weight detected by the weight detector while the workpiece is conveyed becomes equal to the stored static weight.

According to the above configuration, the applied load on the conveyance robot regarding the workpiece can be set to substantially zero. With this, the conveyance system can lift up and convey the workpiece whose mass exceeds a conveyable mass of the conveyance robot.

In the above invention, the conveyance system may be configured such that: the suspending mechanism includes an attaching portion to which the workpiece is attached and a plurality of suspending portions configured to suspend the attaching portion at different positions; the lifting unit includes a plurality of lifting mechanisms respectively provided for the suspending portions and configured to respectively change suspending lengths of the suspending portions; and the first controller individually drives the lifting mechanisms.

According to the above configuration, by individually driving the lifting mechanisms, the suspending lengths of the suspending portions can be individually changed. With this, the posture of the attaching portion can be changed. To be specific, the posture of the workpiece can be changed. For example, the workpiece can be inclined or rotated.

In the above invention, the conveyance system may be configured such that: the support mechanism includes a drive unit configured to move the suspending mechanism in the horizontal direction; and when the conveyance robot moves the guide part in the horizontal direction, the first controller drives the drive unit in synchronization with the horizontal movement of the guide part.

According to the above configuration, the horizontal movement of the workpiece by the conveyance robot can be assisted. Thus, the conveyance robot can move the workpiece in the horizontal direction with a lower output.

In the above invention, the conveyance system may be configured such that the guide part guides and conveys the workpiece in the horizontal direction while allowing a relative upper-lower movement of the workpiece relative to the guide part.

According to the above configuration, the conveyance robot allows the relative upper-lower movement of the workpiece. Therefore, the upper-lower interfering force applied from the suspending device to the conveyance robot during the conveyance of the workpiece can be eliminated. With this, the applied load on the conveyance robot due to the interfering force can be eliminated.

A conveyance method of a conveyance system of the present invention is a conveyance method of a conveyance system, the conveyance system including: a conveyance robot configured to move and convey a workpiece in a horizontal direction; and a suspending device including a suspending mechanism configured to suspend the workpiece, a lifting unit configured to lift up and down the workpiece suspended by the suspending mechanism, and a support mechanism configured to support the suspending mechanism such that the suspending mechanism is movable in the horizontal direction, the conveyance method including: a conveying step of conveying the workpiece by the conveyance robot; and a lifting step of lifting up and down the workpiece by the lifting unit.

According to the above configuration, the suspending device can lift up and down the workpiece, suspended by the suspending mechanism, by the lifting unit. In addition, when conveying the workpiece, the conveyance robot can move the workpiece in the horizontal direction together with the suspending mechanism. Therefore, lifting up and down the workpiece during the conveyance of the workpiece can be supported by the suspending device. Thus, the applied load acting on the conveyance robot can be reduced.

In the above invention, the conveyance method may be designed such that: the conveyance robot includes a guide part configured to guide the workpiece and moves the guide part in the horizontal direction and an upper-lower direction to convey the workpiece; and the upper-lower movement operation of the guide part in the conveying step and the lifting operation of the workpiece in the lifting step are synchronized with each other.

According to the above configuration, since the upper-lower movement operation of the guide part by the conveyance robot and the lifting operation of the workpiece by the lifting unit are synchronized with each other, the guide part and the workpiece can be integrally lifted up and down. With this, it is possible to prevent a case where the guide portion and the workpiece move separately, and this causes an unnecessary applied load to act on the conveyance robot.

In the above invention, the conveyance method may be designed such that the lifting operation of the workpiece by the lifting unit in the lifting step is executed in synchronization with the upper-lower movement operation of the guide part by the conveyance robot in the conveying step.

According to the above configuration, synchronizing the upper-lower movement operation of the guide part by the conveyance robot and the lifting operation of the workpiece by the lifting unit can be realized.

In the above invention, the conveyance method may be designed such that the upper-lower movement operation of the guide part by the conveyance robot in the conveying step is executed in synchronization with the lifting operation of the workpiece by the lifting unit in the lifting step.

According to the above configuration, synchronizing the upper-lower movement operation of the guide part by the conveyance robot and the lifting operation of the workpiece by the lifting unit can be realized.

In the above invention, the conveyance method may be designed such that in the conveying step, the workpiece is conveyed by executing with respect to the conveyance robot a compliance control operation in which compliance with respect to the upper-lower movement of the guide part is set to be low, and compliance with respect to the horizontal movement of the guide part is set to be high.

According to the above configuration, since the compliance with respect to the horizontal movement of the guide part is set to be high, the conveyance accuracy of the workpiece in the horizontal direction can be increased. In contrast, the compliance with respect to the upper-lower movement of the guide part is set to be low. Therefore, even if the upper-lower interfering force generated due to the lifting operation of the suspending device acts on the conveyance robot, the conveyance robot can be prevented from being damaged or breaking.

In the above invention, the conveyance method may be designed such that in the lifting step, a static weight of the suspended workpiece is stored, and the workpiece is lifted up and down such that the weight detected while the workpiece is conveyed becomes equal to the stored static weight.

According to the above configuration, the applied load on the conveyance robot regarding the workpiece can be set to substantially zero. With this, the conveyance system can lift up and convey the workpiece whose mass exceeds the conveyable mass of the conveyance robot.

The above object, other objects, features, and advantages of the present invention will be made clear by the following detailed explanation of preferred embodiments with reference to the attached drawings.

Advantageous Effects of Invention

According to the present invention, the applied load acting on the conveyance robot when lifting up and down the workpiece can be reduced.

DESCRIPTION OF EMBODIMENTS

Hereinafter, conveyance systems of embodiments according to the present invention will be explained in reference to the drawings. A concept of directions used in the following explanations is used for convenience of explanation, and those directions are not limited to directions explained below. In addition, the conveyance systems explained below are just the embodiments of the present invention. Therefore, the present invention is not limited to the embodiments, and additions, deletions, and modifications may be made within the scope of the present invention.

Embodiment 1

Conveyance System

Figure 1:
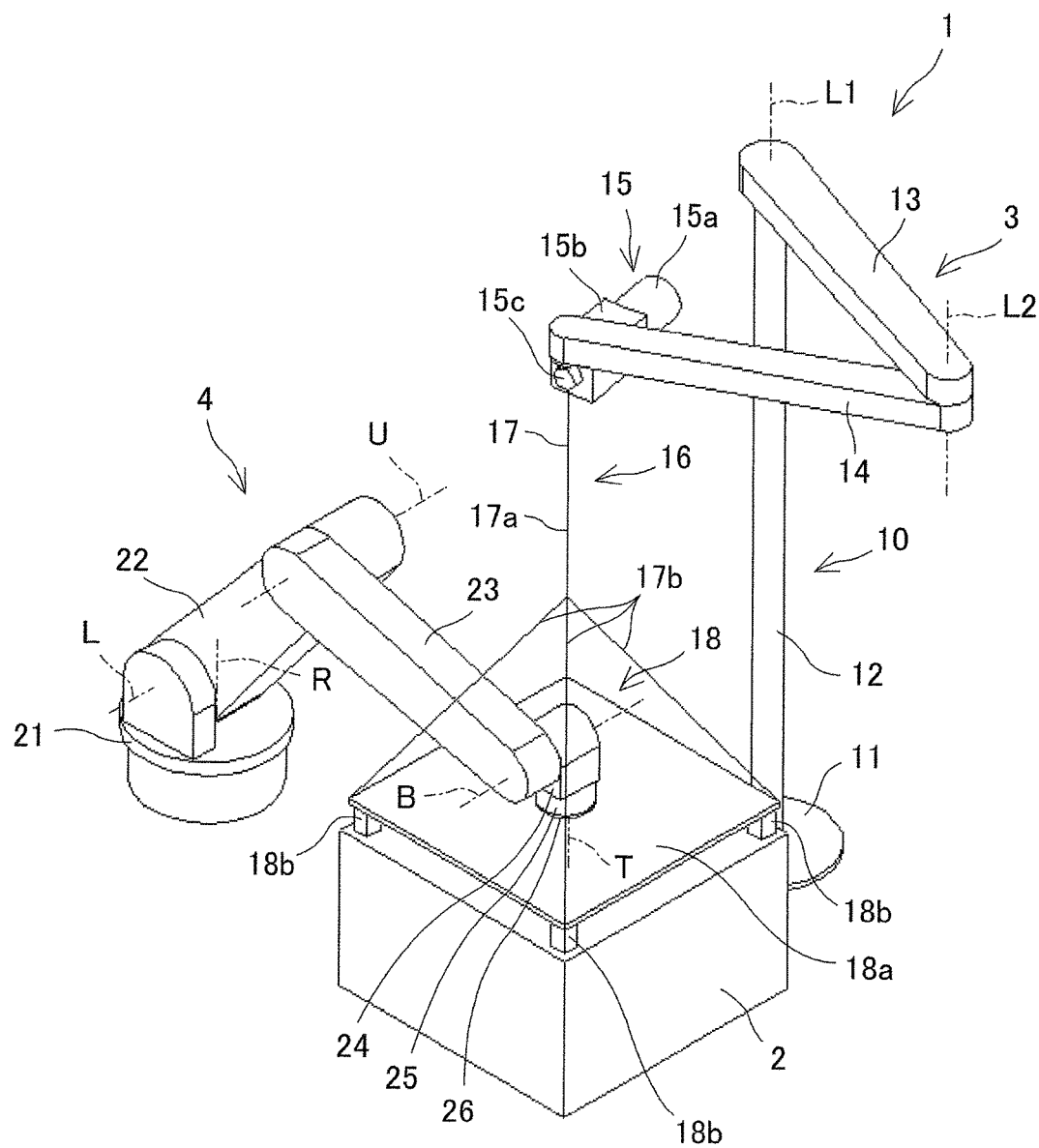
FIG. 1 is a perspective view showing a conveyance system of Embodiment 1 of the present invention.

Referring to FIG. 1, a conveyance system 1 is a system configured to convey heavy workpieces, such as metal parts (casings, etc.), metal materials before molding, and metal molds for manufacturing the metal parts. Objects to be conveyed by the conveyance system 1 are not limited to the heavy workpieces and may be the workpieces of not more than one hundred kilograms. Hereinafter, the object to be conveyed is simply referred to as a workpiece 2. The conveyance system 1 includes a suspending device 3, a robot 4, a conveyance controller 5, and a suspension controller 6. The suspending device 3 and the robot 4 cooperate to convey the workpiece 2.

Suspending Device

The suspending device 3 includes a support mechanism 10, a lifting unit 15, and a suspending mechanism 16, and the support mechanism 10 includes a base 11, a post member 12, and two arms 13 and 14. The base 11 is fixed to a floor, an underframe, or the like, and the post member 12 stands on the base 11. The post member 12 extends upward from the base 11, and a base end arm 13 is provided at an upper end portion of the post member 12. A base end portion of the base end arm 13 is provided at the post member 12. The base end arm 13 is configured to be rotatable relative to the post member 12 around an axis L1 that is a vertical axis, and a tip end arm 14 is provided at a tip end portion of the base end arm 13. The tip end arm 14 is also configured such that a base end portion thereof is rotatable relative to the base end arm 13 around an axis L2. The axis L2 is a vertical axis parallel to the axis L1 and different from the axis L1. The lifting unit 15 is provided at a tip end portion of the tip end arm 14 configured to rotate as above.

The lifting unit 15 includes a servo motor 15a, a reducer 15b, and a winding drum 15c. The servo motor 15a is used as a driving source of the suspending mechanism 16 explained below in detail and is configured to control a height position of the suspending mechanism 16. The winding drum 15c is attached to the servo motor 15a through the reducer 15b, and the suspending mechanism 16 is provided at the winding drum 15c. The suspending mechanism 16 includes a suspending wire 17 and an attaching mechanism 18. The suspending wire 17 includes a main body portion 17a and four branching portions 17b. A part of the main body portion 17a including its upper end winds around the winding drum 15c, and the remaining part of the main body portion 17a hangs down from the winding drum 15c. The four branching portions 17b are connected to a lower end portion of the main body portion 17a. The four branching portions 17b branch and extend in four directions from the lower end portion of the main body portion 17a, and the attaching mechanism 18 that is an attaching portion is coupled to lower end portions of the branching portions 17b.

The attaching mechanism 18 includes a main body 18a and four attaching parts 18b. For example, the main body 18a is a substantially rectangular plate-shaped member made of a magnetic material, and the lower end portions of the branching portions 17b are respectively coupled to four corners of an upper surface of the main body 18a. These four branching portions 17b are substantially the same in length as one another, and the posture of the main body 18a is maintained in a substantially horizontal state. The attaching parts 18b are respectively fixed to four corners of a lower surface of the main body 18a. For example, the attaching parts 18b are parts constituted by eyebolts (hanger bolts), hooks, clamps, or electromagnetic solenoids and are configured to be detachable from the workpiece 2. In the present embodiment, the attaching parts 18b are constituted by the electromagnetic solenoids capable of switching on and off its electromagnetic attraction depending on an applied signal.

The suspending device 3 configured as above can suspend the workpiece 2 through the suspending mechanism 16 by attaching the workpiece 2 to the attaching parts 18b and can lift up the workpiece 2 by driving the servo motor 15a of the lifting unit 15 to wind the suspending wire 17. In addition, the suspending device 3 can lift down the suspended workpiece 2 to put the workpiece 2 on a floor, a base, or the like by driving the servo motor 15a to unwind the suspending wire 17.

In the suspending device 3 configured to lift up and down the suspended workpiece 2 as above, the base end arm 13 is rotatably configured so as to freely move relative to the post member 12, and the tip end arm 14 is rotatably configured so as to freely move relative to the base end arm 13. Therefore, the base end arm 13 and tip end arm 14 of the suspending device 3 move so as to follow a horizontal movement of the attaching mechanism 18. With this, the suspending device 3 can move the workpiece 2 to a predetermined position by moving the attaching mechanism 18 in the horizontal direction, and the robot 4 is used as a device that guides and moves the attaching mechanism 18 in the horizontal direction. It should be noted that in a conveyance system 1C of Embodiment 4 described below, the base end arm 13 and the tip end arm 14 are configured to be respectively rotated by a first drive unit 51 and a second drive unit 52.

Robot

For example, the robot 4 that is a conveyance robot is a so-called vertical articulated robot, and the present embodiment adopts a five-axis robot. The robot 4 includes a base 20, four arms 21 to 24, and a wrist tip end portion 25. The base 20 is fixed to a floor, an underframe, or the like, and a first arm 21 is provided on the base 20. The first arm 21 is configured to be rotatable relative to the base 20 around an axis R that is a vertical axis. A second arm 22 is provided at an upper portion of the first arm 21. The second arm 22 is configured to be swingable relative to the first arm 21 in a front-rear direction around an axis L that is a horizontal axis. A third arm 23 is provided at an upper portion of the second arm 22. The third arm 23 is configured to be rotatable relative to the second arm 22 around an axis U. The axis U is a horizontal axis parallel to the axis L and different from the axis L. A fourth arm 24 is provided at a tip end portion of the third arm 23, and the fourth arm 24 rotates relative to the third arm 23 around an axis B. The axis B is a horizontal axis parallel to the axis L and different from the axes L and U. Further, the wrist tip end portion 25 having a substantially columnar shape is provided at a tip end portion of the fourth arm 24.

The wrist tip end portion 25 is attached to the fourth arm 24 such that an axis T that is an axis of the wrist tip end portion 25 is perpendicular to the axis B. The wrist tip end portion 25 is configured to be rotatable relative to the fourth arm 24 around the axis T. A holding part 26 is attached to a tip end portion of the wrist tip end portion 25 configured to rotate as above, and the holding part 26 is configured to be able to hold the main body 18a of the attaching mechanism 18 of the suspending device 3. For example, the holding part 26 that is a guide part is constituted by a hook, an eyebolt (hanger bolt), or a below-described hand 53. In the present embodiment, the holding part 26 is constituted by an electromagnetic solenoid and is excited by applying a current (signal) to the electromagnetic solenoid. By this excitation, the main body 18a of the attaching mechanism 18 made of a magnetic material electromagnetically attracts the holding part 26. Thus, the workpiece 2 is held by the robot 4 through the attaching mechanism 18.

Figure 2:
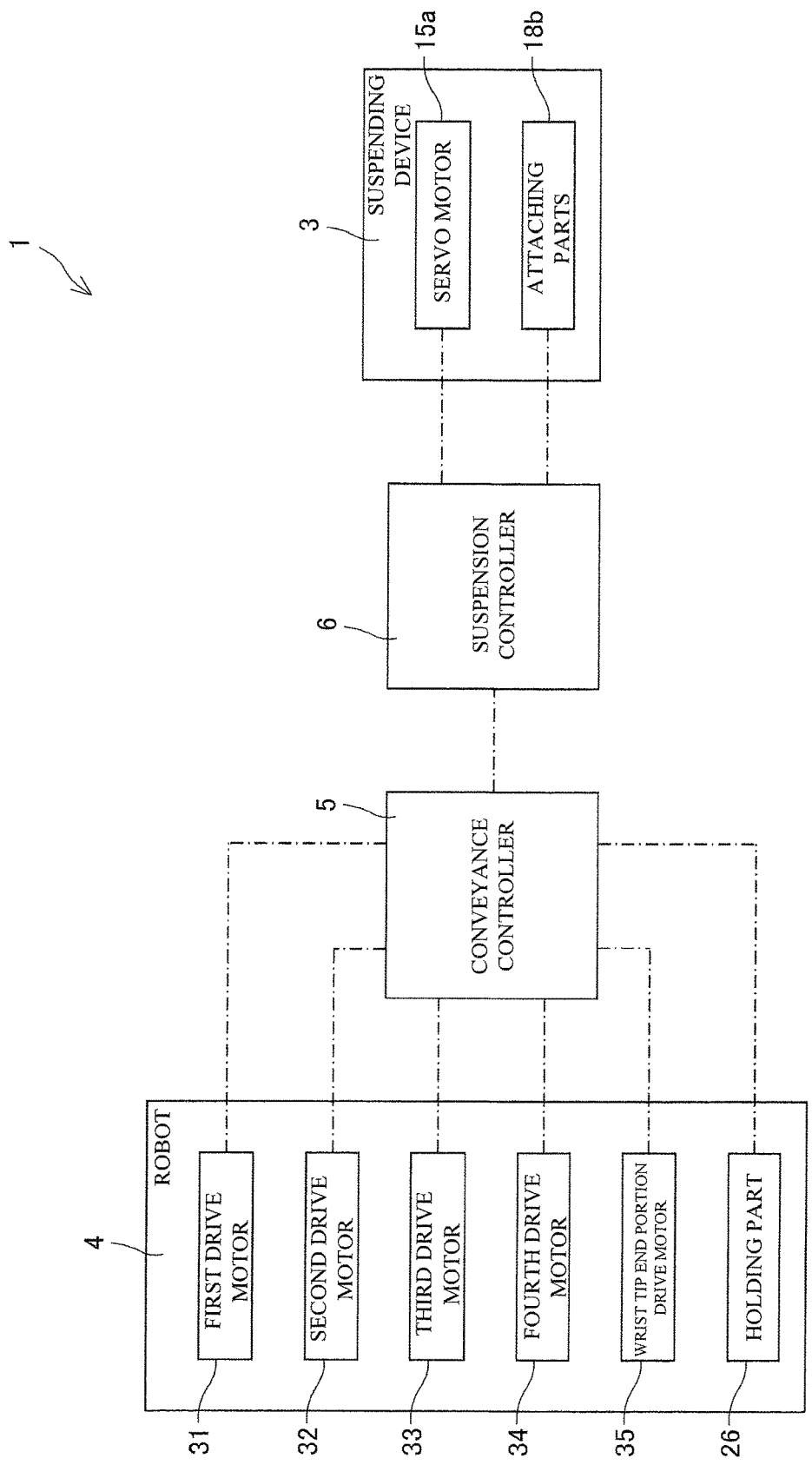
FIG. 2 is a block diagram showing an electric configuration of the conveyance system of FIG. 1.

As shown in FIG. 2, the robot 4 includes first to fourth drive motors 31 to 34 and a wrist tip end portion drive motor 35. The drive motors 31 to 35 are provided so as to respectively correspond to the arms 21 to 24 and the wrist tip end portion 25 and are configured to cause the arms 21 to 24 and the wrist tip end portion 25 to rotate or swing around corresponding axes. The drive motors 31 to 35 are electrically connected to the conveyance controller 5, and the movements thereof are controlled by the conveyance controller 5.

Conveyance Controller

Referring to FIG. 2, the conveyance controller 5 drives the drive motors 31 to 35 to control the operation (i.e., the posture) of the robot 4. The conveyance controller 5 is also connected to the holding part 26 and can apply a signal to the holding part 26. To be specific, the conveyance controller 5 can switch between the attraction of the attaching mechanism 18 to the robot 4 and the separation of the attaching mechanism 18 from the robot 4 by switching between the supply of the signal to the holding part 26 and the block of the supply of the signal to the holding part 26.

The conveyance controller 5 configured as above controls the operation of the robot 4 by an operation based on a preset program or based on a manipulation of a manipulation unit (not shown). In the present embodiment, the conveyance controller 5 is configured to control the operation of the robot 4 in accordance with a program stored in the conveyance controller 5. The conveyance controller 5 is electrically connected to the suspension controller 6 and is configured to transmit a control command to the suspension controller 6 in accordance with the preset program or the manipulation of the manipulation unit (not shown).

Suspending Device Controller

Referring to FIG. 2, the suspension controller 6 is electrically connected to the attaching parts 18*b* of the suspending device 3 and controls the attraction and separation of the attaching parts 18*b* to and from the workpiece 2 by switching between on and off of the signal applied to the attaching parts 18*b*. The suspension controller 6 is electrically connected to the servo motor 15*a* and controls the rotation operation of the servo motor 15*a*. More specifically, the suspension controller 6 controls the rotation operation of the servo motor 15*a* (i.e., the operation of the lifting unit 15) in synchronization with an upper-lower movement of the holding part 26 based on the control command transmitted from the conveyance controller 5.

Figure 3:
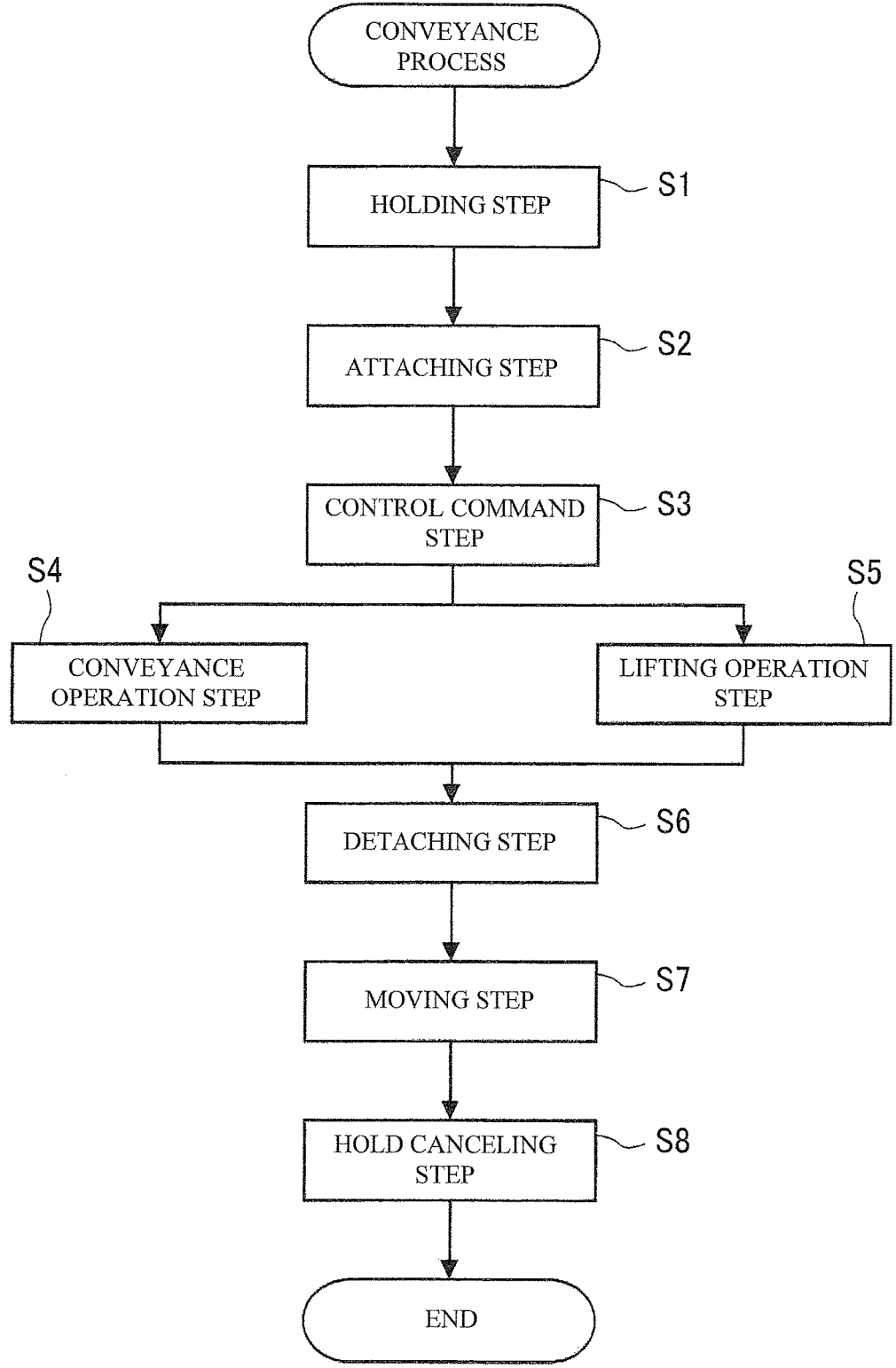
FIG. 3 is a flow chart showing procedures of first and second conveyance operations executed by the conveyance system of FIG. 1.

According to the conveyance system 1 configured as above, when the workpiece is being conveyed, the lifting operation of the lifting unit 15 is performed in synchronization with an upper-lower movement operation of the holding part 26. With this, the applied load on the robot 4 when the workpiece 2 is lifted up and down is reduced. Hereinafter, the conveyance operations when the conveyance system 1 conveys the workpiece 2 will be explained in reference to FIGS. 3 to 5.

First Conveyance Operation

When the workpiece 2 is placed at a conveyance start position, and a command for starting a conveyance process is input to the conveyance controller 5, the conveyance process (conveyance method) starts and then proceeds to a holding step (Step S1). In the holding step, the holding part 26 of the robot 4 is attached to the attaching mechanism 18. More specifically, the conveyance controller 5 drives the drive motors 31 to 35 (i.e., controls the operation of the robot 4) to change the posture of the robot 4. Thus, the conveyance controller 5 causes the holding part 26 of the robot 4 to contact an upper surface of the attaching mechanism 18. Then, the conveyance controller 5 applies a signal to the holding part 26 to cause the holding part 26 to electromagnetically attract the attaching mechanism 18. With this, the attaching mechanism 18 is held by the robot 4.

Next, an attaching step is executed (Step S2). In the attaching step, the workpiece 2 is attached to the attaching mechanism 18. More specifically, the conveyance controller 5 first drives the drive motors 31 to 35 to move the holding part 26. Thus, the attaching mechanism 18 is moved to a position above the workpiece 2. Next, the suspension controller 6 applies signals to all the electromagnetic solenoids of the four attaching parts 18*b* to cause the attaching parts 18*b* to electromagnetically attract the workpiece 2. With this, the workpiece 2 is attached to the attaching mechanism 18.

Next, a control command step is executed (Step S3). In the control command step, the conveyance controller 5 generates a control command regarding the control of the operation of the lifting unit 15 and transmits the control command to the suspension controller 6. More specifically, the conveyance controller 5 first derives an upper-lower operation, performed after the present time, of the holding part 26 based on the program stored in the conveyance controller 5. After the derivation, the conveyance controller 5 generates a control command for synchronizing the upper-lower operation of the holding part 26 and the operation of the attaching mechanism 18 and then transmits the control command to the suspension controller 6.

Next, a conveyance operation step (Step S4) and a lifting operation step (Step S5) are executed concurrently. In the present embodiment, the control command is generated based on the program. However, the present embodiment may be such that: the control command is stored in the conveyance controller 5 in advance, and the conveyance controller 5 transmits the control command to the suspension controller 6; or the control command is stored in the suspension controller 6 in advance. In a case where the control command is stored, the control command step (Step S3) is omitted, and the conveyance process proceeds from the attaching step (Step S2) directly to the conveyance operation step and the lifting operation step.

In the conveyance operation step, the conveyance controller 5 controls the operation of the robot 4 in accordance with the stored program. Thus, the robot 4 moves the holding part 26 to move the workpiece 2 to a conveyance termination position that is a predetermined position. The lifting operation step is executed concurrently with the conveyance operation step. In the lifting operation step, the suspension controller 6 controls the operation of the lifting unit 15 based on the control command. Thus, the lifting unit 15 suspends the workpiece 2 through the suspending mechanism 16 and lifts up and down the suspended workpiece 2. This lifting operation is synchronized with the upper-lower operation of the holding part 26 in the conveyance operation step, and the following will explain its procedure in detail.

Figure 4:
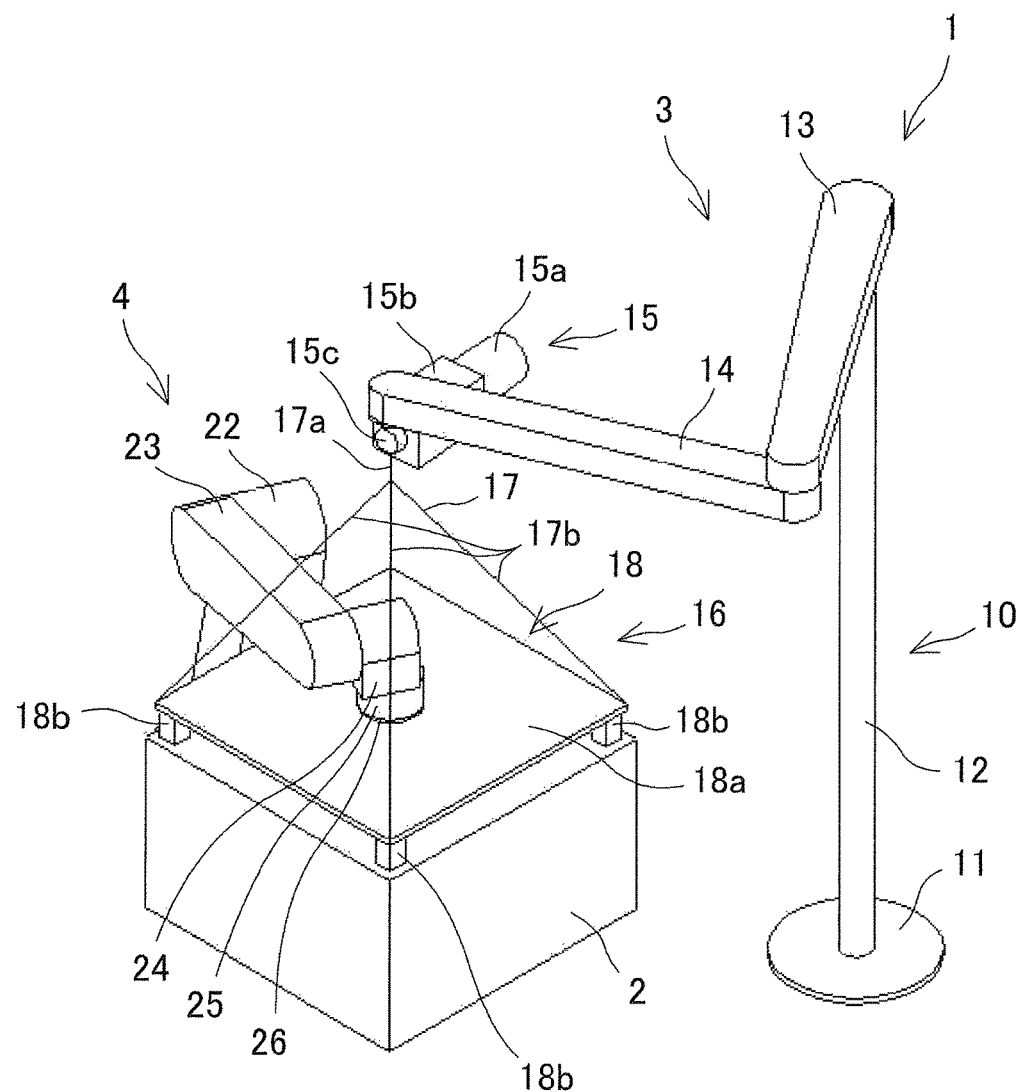
FIG. 4 is a perspective view showing a state where a heavy workpiece is being conveyed by the conveyance system of FIG. 1.

First, in the conveyance operation step, in order to control the operation of the robot 4 such that the workpiece 2 is lifted up from the conveyance start position, the conveyance controller 5 drives the drive motors 31 to 35 to lift up the holding part 26. Concurrently with this, in the lifting operation step, the suspension controller 6 controls the operation of the lifting unit 15 based on the control command. Thus, the workpiece 2 is lifted up in accordance with a lift-up speed of the holding part 26 as shown in FIG. 4. As above, since the workpiece 2 is lifted up by synchronizing the operation of the lifting unit 15 with the operation of the holding part 26, the weight of the workpiece 2 can be mainly supported by the suspending device 3, so that the applied load on the robot 4 regarding the workpiece 2 can be reduced. Therefore, the conveyance system 1 can lift up the workpiece 2 whose mass exceeds a conveyable mass of the robot 4.

The conveyance controller 5 executes a compliance control operation with respect to the robot 4 that suspends the workpiece 2. In the compliance control operation executed here, the compliance with respect to the upper-lower movement of the holding part 26 is set to be low, and the compliance with respect to the horizontal movement of the holding part 26 is set to be high. Therefore, the robot 4 hardly causes an upper-lower restraining force to act on the workpiece 2, and the suspending device 3 can be caused to support the substantially entire weight of the workpiece 2. With this, the weight of the workpiece 2 acting on the robot 4 can be set to substantially zero, and the applied load on the robot 4 regarding the workpiece 2 can be set to substantially zero. Therefore, a robot whose conveyable mass is small can be adopted as the robot 4. Thus, the conveyance system can be reduced in size and cost.

When the lifted-up workpiece 2 reaches a predetermined height, the conveyance controller 5 controls the operation of the robot 4 to stop the lift-up operation of the holding part 26, and concurrently, the suspension controller 6 controls the operation of the lifting unit 15 based on the control command to stop the lift-up of the workpiece 2. Next, in order to control the operation of the robot 4, the conveyance controller 5 drives the drive motors 31 to 35. Thus, the holding part 26 is horizontally moved, so that the workpiece 2 is horizontally moved to a position above the conveyance termination position. This horizontal movement denotes that the holding part 26 that is an object to be conveyed is moved in the horizontal direction almost without changing the height of the holding part 26. When the holding part 26 is horizontally moved, the base end arm 13 and tip end arm 14 of the suspending device 3 move so as to follow the movement of the holding part 26, and the attaching mechanism 18 and the workpiece 2 attached to the attaching mechanism 18 horizontally move in conjunction with the movement of the holding part 26. With this, the robot 4 horizontally moves the workpiece 2 suspended by the suspending device 3.

The suspension controller 6 controls the operation of the lifting unit 15 in accordance with the control command to cause the lifting unit 15 to maintain the height of the workpiece 2. With this, the load on the robot 4 by the weight of the workpiece 2 when the workpiece 2 is horizontally moved can be reduced, and an articulated robot capable of mainly outputting only an acting force for horizontally moving the workpiece 2 can be adopted as the robot 4. The acting force for horizontally moving the workpiece 2 is much lower than a force for lifting up the workpiece 2. Therefore, the articulated robot whose conveyable mass is small can be adopted as the robot 4. Thus, the conveyance system can be reduced in size and cost.

In the present embodiment, the conveyance controller 5 and the suspension controller 6 control the operation of the robot 4 and the operation of the suspending device 3 such that the workpiece 2 is horizontally moved while the height thereof is being maintained. However, the workpiece 2 does not have to be moved as above. To be specific, the conveyance controller 5 and the suspension controller 6 may control the operation of the robot 4 and the operation of the suspending device 3 such that the workpiece 2 is moved in the horizontal direction while being lifted up or down. In this case, as with a case where the workpiece 2 is lifted up, the suspension controller 6 controls the operation of the suspending device 3 based on the control command such that the operation of the lifting unit 15 is synchronized with the upper-lower operation of the holding part 26. With this, as with a case where the workpiece 2 is horizontally moved, the applied load on the robot 4 can be reduced.

Figure 5:
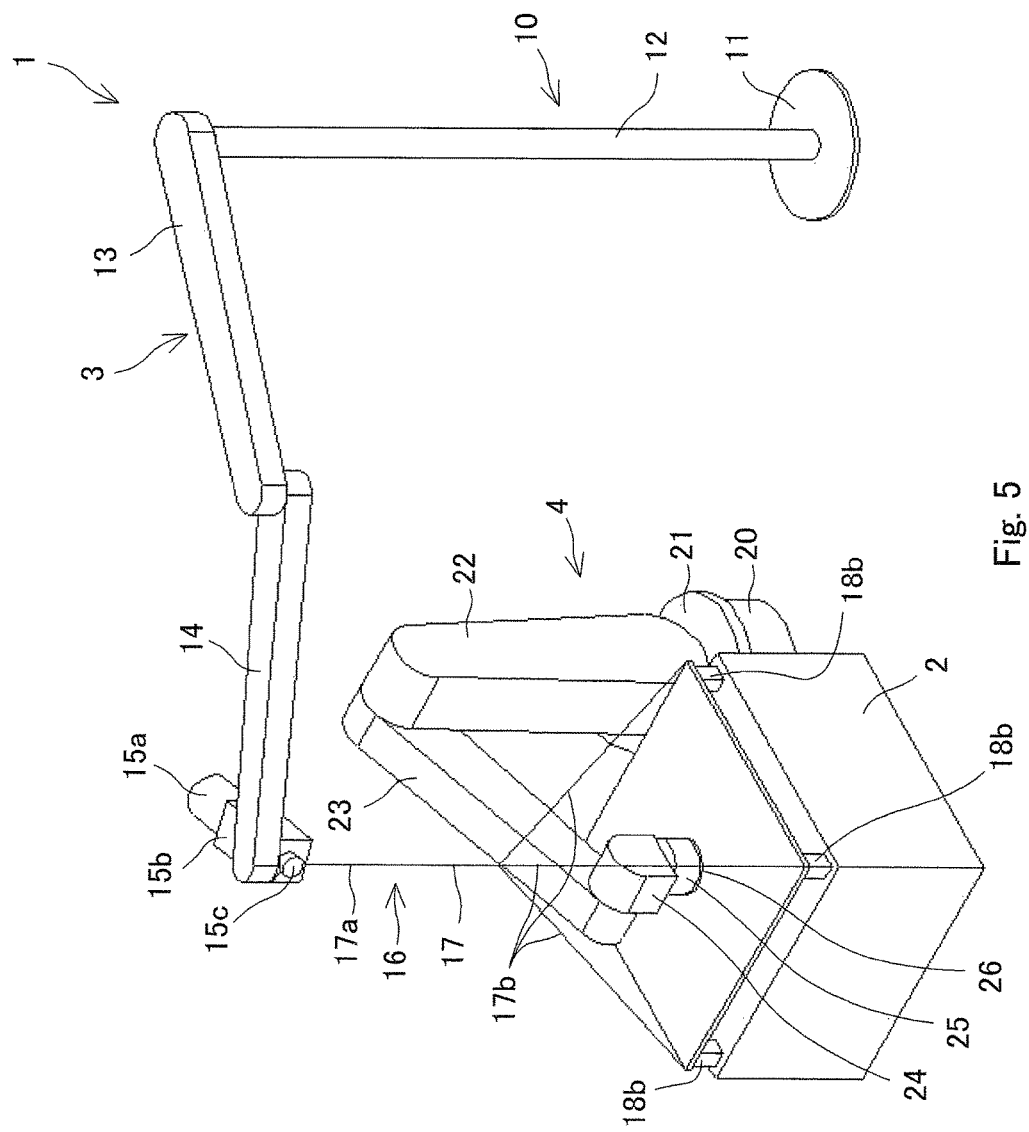
FIG. 5 is a perspective view showing a state where the heavy workpiece has been conveyed to a predetermined position by the conveyance system of FIG. 1.

When the workpiece 2 is moved to a position above the conveyance termination position by operating the suspending device 3 and the robot 4, the conveyance controller 5 controls the operation of the robot 4 to lift down the holding part 26. Thus, the workpiece 2 is placed at the conveyance termination position. Concurrently, the suspension controller 6 controls the operation of the lifting unit 15 based on the control command. Thus, the lifting unit 15 lifts down the workpiece 2 in accordance with the lift-up speed of the holding part 26 as shown in FIG. 5. As above, since the workpiece 2 is lifted down by synchronizing the operation of the lifting unit 15 with the operation of the holding part 26, the workpiece 2 suspended by the suspending mechanism 16 can be placed at the conveyance termination position without increasing the applied load on the robot 4.

Next, a detaching step (Step S6) is executed. In the detaching step, the suspension controller 6 blocks the signals, supplied to the attaching parts 18b, to cancel the electromagnetic attraction of the attaching parts 18b to the workpiece 2. With this, the workpiece 2 can be detached from the attaching mechanism 18.

Next, a moving step is executed (Step S7). In the moving step, the conveyance controller 5 controls the operation of the robot 4 to move the holding part 26. Thus, the attaching mechanism 18 is returned to an original position.

Next, a hold canceling step is executed (Step S8). In the hold canceling step, the conveyance controller 5 blocks the signal supplied to the electromagnetic solenoid of the holding part 26. Thus, the holding part 26 is detached from the attaching mechanism 18. Further, the conveyance controller 5 controls the operation of the robot 4 to move the holding part 26. Thus, the robot 4 is caused to perform the other operation. Then, the conveyance process is terminated.

According to the conveyance system 1 configured as above, the workpiece 2 is not lifted up only by the suspending device 3, but the workpiece 2 is moved by causing the robot 4 having high positioning accuracy and the suspending device 3 to cooperate with each other. Therefore, the accuracy of the position and height of the workpiece 2 conveyed to the conveyance termination position can be improved.

Especially, in the first conveyance operation, the compliance control operation in which the compliance with respect to the horizontal movement of the holding part 26 is set to be high is being executed with respect to the robot 4. Therefore, the conveyance accuracy of the workpiece 2 in the horizontal direction can be increased. In contrast, in the compliance control operation, the compliance with respect to the upper-lower movement of the holding part 26 is set to be low. Therefore, even if an upper-lower interfering force generated due to the lifting operation of the suspending device 3 acts on the robot 4, the robot 4 can be prevented from being damaged or breaking. The suspending device 3 is constituted by two arms 13 and 14 which are lower in stiffness than the robot 4. Therefore, even if the upper-lower interfering force acts on the suspending device 3, the suspending device 3 can be prevented from being damaged or breaking.

As described above, in the first conveyance operation, the workpiece 2 is conveyed by synchronizing the operation of the suspending device 3 by the suspension controller 6 with the operation of the robot 4 by the conveyance controller 5, specifically the upper-lower operation of the holding part 26. Although the workpiece 2 is conveyed by synchronizing the operation of the suspending device 3 and the operation of the robot 4, an object to be synchronized in the suspending device 3 is only the servo motor 15a of the lifting unit 15. Therefore, the operation of the suspending device 3 can be easily caused to cooperate with the operation of the robot 4. Thus, the cooperation control of the operation of the suspending device 3 and the operation of the robot 4 is easy.

Since the workpiece 2 is conveyed by synchronizing the operation of the suspending device 3 by the suspension controller 6 with the upper-lower operation of the holding part 26, the holding part 26 and the attaching mechanism 18 can be integrally lifted up and down. With this, the unnecessary applied load on the conveyance robot due to separate movements of the holding part 26 and the attaching mechanism 18 can be prevented from being generated.

In the above first conveyance operation, the operation of the lifting unit 15 is synchronized with the upper-lower operation of the holding part 26. However, conversely, the operation of the holding part 26 may be synchronized with the operation of the lifting unit 15. Hereinafter, a second conveyance operation of conveying the workpiece 2 by this synchronization control operation will be explained. Points of the second conveyance operation different from the first conveyance operation will be mainly explained, and an explanation of the same procedure may be omitted.

Second Conveyance Operation

In the second conveyance operation, a preset program is stored in the suspension controller 6, and the suspension controller 6 controls the operation of the lifting unit 15 in accordance with the stored program. In addition, the suspension controller 6 generates a control command regarding the operation of the robot 4 (mainly an operation of lifting up and down the workpiece 2) based on the stored program and transmits this control command to the conveyance controller 5. The conveyance controller 5 controls the operation of the robot 4 based on the control command.

In the second conveyance operation, in the control command step (Step S3), the suspension controller 6 transmits the control command regarding the operation of the robot 4 to the conveyance controller 5. More specifically, the suspension controller 6 generates based on the stored program the control command for synchronizing the operation of the robot 4 with the lifting operation of the workpiece 1 by the lifting unit 15 and transmits the control command to the conveyance controller 5.

Next, the conveyance operation step (Step S4) and the lifting operation step (Step S5) are executed in parallel. In the lifting operation step, the suspension controller 6 controls the operation of the lifting unit 15 based on the stored program, and in the conveyance operation step, the conveyance controller 5 controls the operation of the robot 4 based on the received control command and the stored program. Thus, the holding part 26 is moved, so that the workpiece 2 is moved to the conveyance termination position that is the predetermined position. The conveyance operation in the conveyance operation step is synchronized with the operation of the lifting unit 15 in the lifting operation of the lifting operation step. The following will explain the procedure of this synchronization.

In the lifting operation step, the suspension controller 6 controls the operation of the lifting unit 15 in accordance with the stored program. Thus, the workpiece 2 is lifted up from the conveyance start position. Concurrently, in the conveyance operation step, the conveyance controller 5 drives the drive motors 31 to 35 based on the control command. Thus, the holding part 26 is lifted up in accordance with the lift-up speed of the attaching mechanism 18 by the lifting unit 15. As above, since the workpiece 2 is lifted up by synchronizing the lift-up operation of the holding part 26 with the operation of the lifting unit 15, the workpiece 2 is suspended by the suspending device 3. After that, when the suspended workpiece 2 reaches a predetermined height, the suspension controller 6 controls the operation of the lifting unit 15 to maintain the height of the workpiece 2. Concurrently, the conveyance controller 5 controls the operation of the robot 4 based on the stored program or the control command. Thus, the holding part 26 is horizontally moved, so that the workpiece 2 is horizontally moved to a position above the conveyance termination position.

When the workpiece 2 is moved to the position above the conveyance termination position, the suspension controller 6 controls the operation of the lifting unit 15 to lift down the workpiece 2. Concurrently, the conveyance controller 5 controls the operation of the robot 4 in accordance with the control command. Thus, the holding part 26 is lifted down in synchronization with the operation of the lifting unit 15, and the workpiece 2 is placed at the conveyance termination position. Then, the workpiece 2 is placed at the conveyance termination position. After that, the detaching step (Step S6) is executed.

The operational advantages obtained in a case where the workpiece 2 is conveyed by the second conveyance method are the same as the operational advantages obtained in a case where the workpiece 2 is conveyed by the first conveyance method. The conveyance system 1 may be configured to include both a first conveyance method and a second conveyance method, wherein an operator can operate the conveyance system 1 by selecting the first conveyance method or the second conveyance method.

Embodiment 2

A conveyance system 1A of Embodiment 2 is similar in configuration to the conveyance system 1 of Embodiment 1. Hereinafter, points of the configuration of the conveyance system 1A of Embodiment 2 different from the conveyance system 1 of Embodiment 1 will be mainly explained. The same reference signs are used for the same components, and explanations thereof may be omitted. The same is true for the other embodiments explained below.

Figure 6:
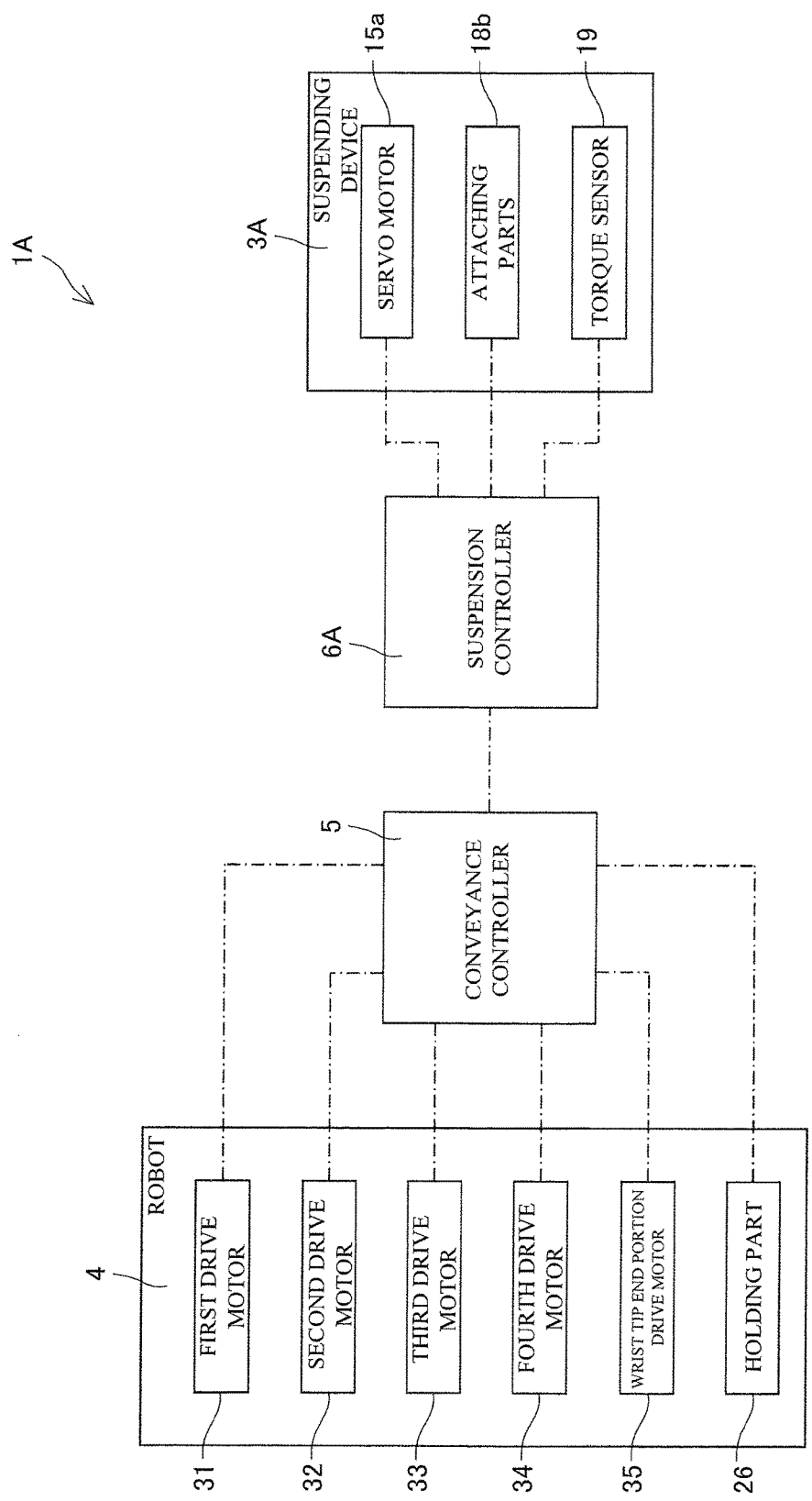
FIG. 6 is a block diagram showing the electric configuration of the conveyance system of Embodiment 2 of the present invention.
Figure 7:
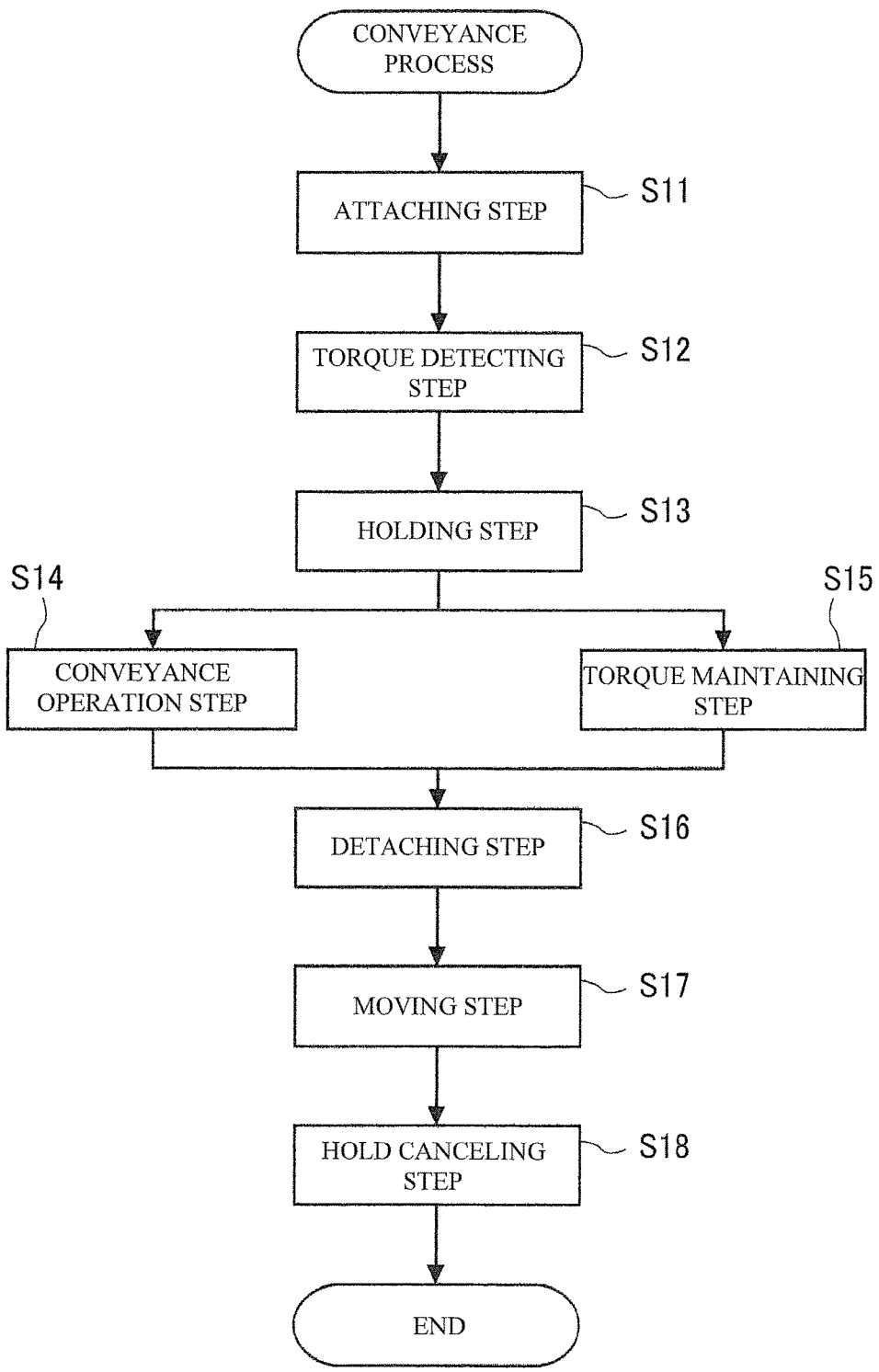
FIG. 7 is a flow chart showing a procedure of a third conveyance operation executed by the conveyance system of FIG. 6.

The conveyance system 1A of Embodiment 2 includes a suspending device 3A and the robot 4, and the suspending device 3A includes a torque sensor 19 as shown in FIG. 6. The torque sensor 19 has a function of detecting the torque of the servo motor 15a. The torque sensor 19 is electrically connected to a suspension controller 6A and transmits the detected torque to the suspension controller 6A. The suspension controller 6A receives the torque detected by the torque sensor 19 and controls the operation of the lifting unit 15 in accordance with the received torque. Hereinafter, a third conveyance operation when the conveyance system 1A conveys the workpiece 2 will be explained in reference to FIG. 7.

Third Conveyance Operation

When the workpiece 2 is placed at the conveyance start position, and a command for starting the conveyance process is input to the conveyance controller 5 (or the suspension controller 6A), the conveyance process starts and then proceeds to the attaching step (Step S11). In the attaching step, the workpiece 2 is attached to the attaching mechanism 18. More specifically, the conveyance controller 5 controls the operation of the robot 4 and the operation of the holding part 26. Thus, the holding part 26 is attached to the attaching mechanism 18. Further, the conveyance controller 5 controls the operation of the robot 4 and the operation of the holding part 26. Thus, the holding part 26 is moved, so that the attaching mechanism 18 is moved to a position above the workpiece 2. Next, the suspension controller 6A applies the signals to all the four attaching parts 18b to cause the attaching parts 18b to electromagnetically attract the workpiece 2. Then, the conveyance controller 5 blocks the signal supplied to the holding part 26, so that the holding part 26 is detached from the attaching mechanism 18. Thus, the holding part 26 is separated from the attaching mechanism 18.

Next, a torque detecting step (Step S12) is executed. In the torque detecting step, the suspension controller 6A controls the operation of the lifting unit 15 to lift up the workpiece 2, and the torque sensor 19 detects an output torque of the servo motor 15a when the workpiece 2 is being suspended. The torque detected by the torque sensor 19 is stored in the suspension controller 6A as a static torque (static weight). In order to accurately detect the static torque, the holding part 26 is separated from the attaching mechanism 18 in the attaching step. However, the suspension controller 6A may store as the static torque the torque detected without separating the holding part 26 from the attaching mechanism 18.

Next, a holding step (Step S13) is executed. In the holding step, the conveyance controller 5 controls the operation of the robot 4 and the operation of the holding part 26. Thus, the holding part 26 is attached to the attaching mechanism 18 again, and the robot 4 holds the attaching mechanism 18.

Next, the conveyance operation step (Step S14) and the lifting operation step (Step S15) are executed in parallel. In the conveyance operation step, the conveyance controller 5 controls the operation of the robot 4 in accordance with the stored program. Thus, the holding part 26 is moved, so that the workpiece 2 is moved to the conveyance termination position. The lifting operation step is executed concurrently with the conveyance operation step. In the lifting operation step that is a torque maintaining step, the suspension controller 6A causes the torque sensor 19 to transmit the torque at a predetermined time interval (for example, 0.1 second to 2 seconds) and adjusts the output torque of the servo motor 15a such that the received torque becomes equal to the static torque. With this, the suspension controller 6A can maintain the output torque of the servo motor 15a constant regardless of the height and position of the workpiece 2. To be specific, regardless of the height and position of the workpiece 2, a suspending force of the suspending device 3A when suspending the workpiece 2 can be maintained to be the static weight of the workpiece 2. With this, the workpiece 2 can be moved to the conveyance termination position that is the predetermined position in a state where the applied load on the robot 4 regarding the workpiece 2 is set to substantially zero. Thus, the workpiece 2 whose mass exceeds the conveyable mass of the robot 4 can be conveyed. When the workpiece 2 is moved to the conveyance termination position by the robot 4, the torque maintaining operation is terminated.

Next, the detaching step (Step S16) is executed. Then, the moving step (Step S17) and the hold canceling step (Step S18) are executed in this order.

In the detaching step, the suspension controller 6 cancels the electromagnetic attraction of the attaching parts 18b to the workpiece 2, so that the workpiece 2 is detached from the attaching mechanism 18. In the moving step, the conveyance controller 5 controls the operation of the robot 4 to move the holding part 26. Thus, the attaching mechanism 18 is returned to the original position. In the hold canceling step, the conveyance controller 5 detaches the holding part 26 from the attaching mechanism 18 and causes the robot 4 to perform the other operation. When the holding part 26 is detached from the attaching mechanism 18 as above, the conveyance process is terminated.

In addition to the above operational advantages, the conveyance system 1A configured to execute the third conveyance method as above has the same operational advantages as the excellent operational advantages of the conveyance system 1 configured to execute the first conveyance method.

In order to detect the output torque of the servo motor 15a, the conveyance system 1A of Embodiment 2 adopts the torque sensor 19. However, the output torque may be detected based on a current value input to the servo motor 15a without using the torque sensor 19.

Embodiment 3

A conveyance system 1B of Embodiment 3 includes a robot 4B and a suspending device 3B. The robot 4B is a six-axis robot, and the fourth arm 24 rotates relative to the third arm 23 around an axis S. In the present embodiment, the axis S is an axis that is perpendicular to the axis U and coincides with an axis of the fourth arm 24. A fifth arm 27 is provided at a tip end portion of the fourth arm 24. The fifth arm 27 rotates relative to the fourth arm 24 around the axis B. The wrist tip end portion 25 is provided at a tip end portion of the fifth arm 27. The wrist tip end portion 25 rotates relative to the fifth arm 27 around the axis T.

In addition to the drive motors 31 to 35 configured to respectively cause the first to fourth arms 21 to 24 and the wrist tip end portion 25 to rotate, the robot 4B includes a fifth drive motor 36. The fifth drive motor 36 causes the fifth arm 27 to rotate. The fifth drive motor 36 is electrically connected to a conveyance controller 5B, and the conveyance controller 5 controls the operation of the fifth drive motor 36.

Figure 8:
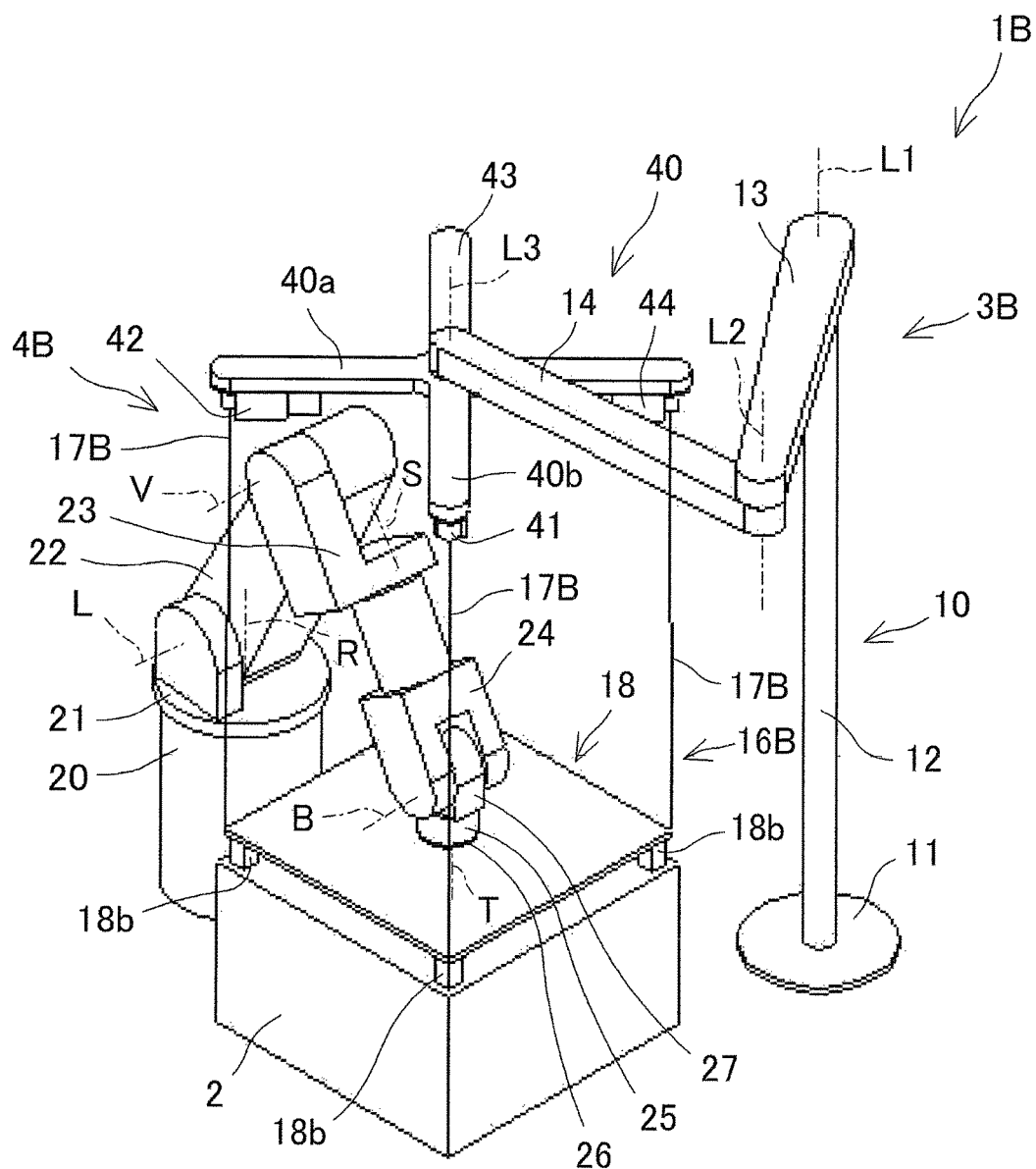
FIG. 8 is a perspective view showing the conveyance system of Embodiment 3 of the present invention.

As shown in FIG. 8, the suspending device 3B includes a lifting unit 15B. The lifting unit 15B includes a support part 40 having a substantially cross shape. The support part 40 is constituted by two rod-like members 40a and 40b. The two rod-like members 40a and 40b are provided so as to be perpendicular to each other. The support part 40 is rotatably configured such that its center point that is a point where the two rod-like members 40a and 40b intersect with each other is attached to a tip end portion of the tip end arm 14. Lifting mechanisms 41 to 44 are respectively provided at both longitudinal end portions of the rod-like member 40a attached to the tip end arm 14 and both longitudinal end portions of the rod-like member 40b attached to the tip end arm 14.

Figure 9:
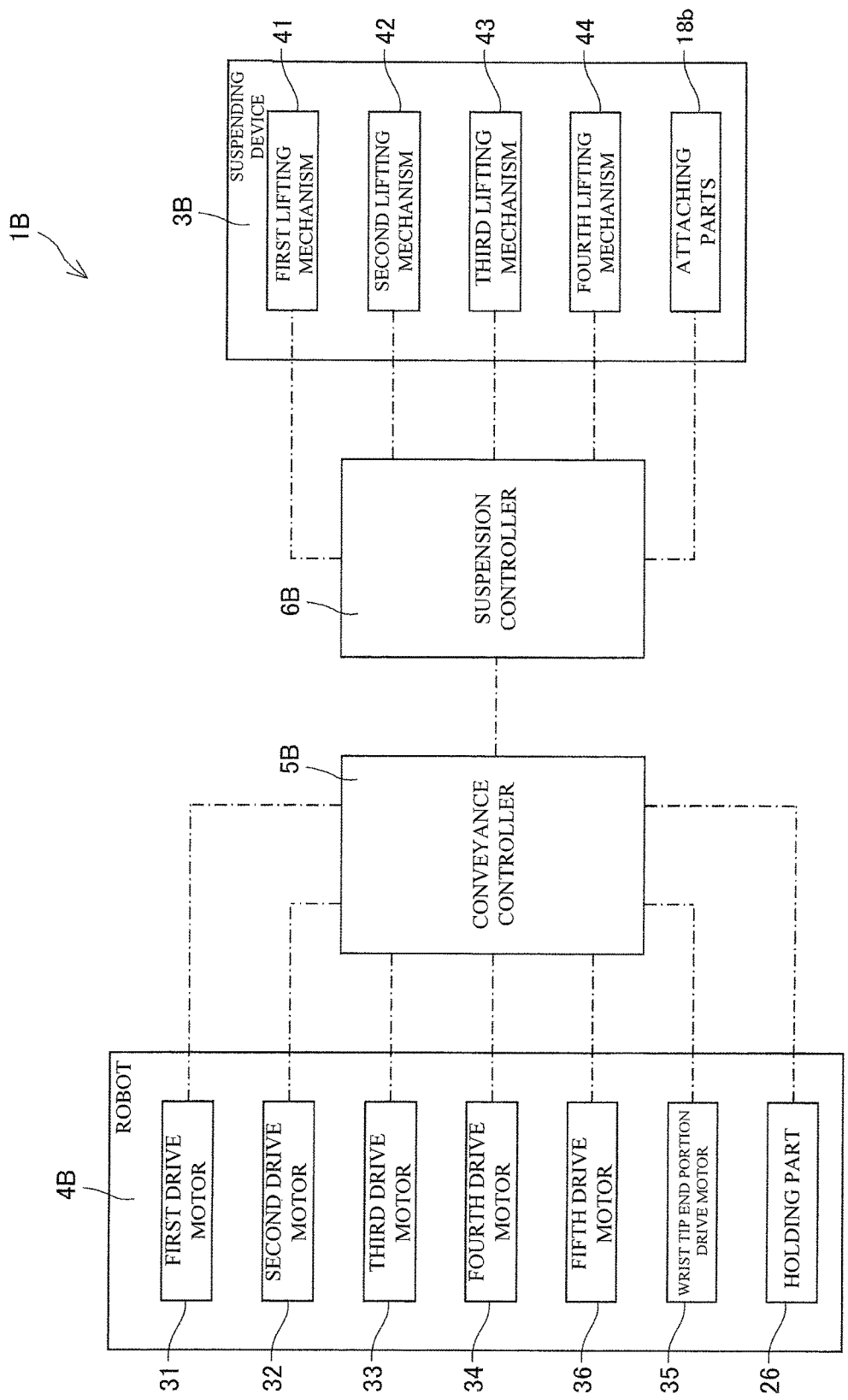
FIG. 9 is a block diagram showing the electric configuration of the conveyance system of FIG. 8.

Each of the lifting mechanisms 41 to 44 has the same configuration as the lifting unit 15 of Embodiment 1. Suspending wires 17B respectively wind around the winding drums 15c. The suspending wires 17B that are suspending portions respectively hang down from the winding drums 15c, and lower end portions of the suspending wires 17B are respectively coupled to four corners of the main body 18a (attaching portion) of the attaching mechanism 18. As shown in FIG. 9, the lifting mechanisms 41 to 44 are electrically connected to the suspension controller 6B, and the operations thereof are individually controlled by the suspension controller 6B.

The conveyance system 1B configured as above can lift up and down the workpiece 2 by controlling the operation of the lifting unit 15B. Therefore, the conveyance system 1B can convey the workpiece 2 by the same method as the above-described three conveyance methods and has the same operational advantages as the conveyance system 1 of Embodiment 1 and the conveyance system 1A of Embodiment 2. Further, the conveyance system 1B can change the posture of the attaching mechanism 18, that is, the posture of the suspended workpiece 2 (for example, incline or rotate the workpiece 2) by individually controlling the operations of the lifting mechanisms 41 to 44. Hereinafter, a case where the posture of the workpiece 2 is changed during the lifting operation (Step S5) will be explained in reference to FIGS. 10 to 12.

Figure 10:
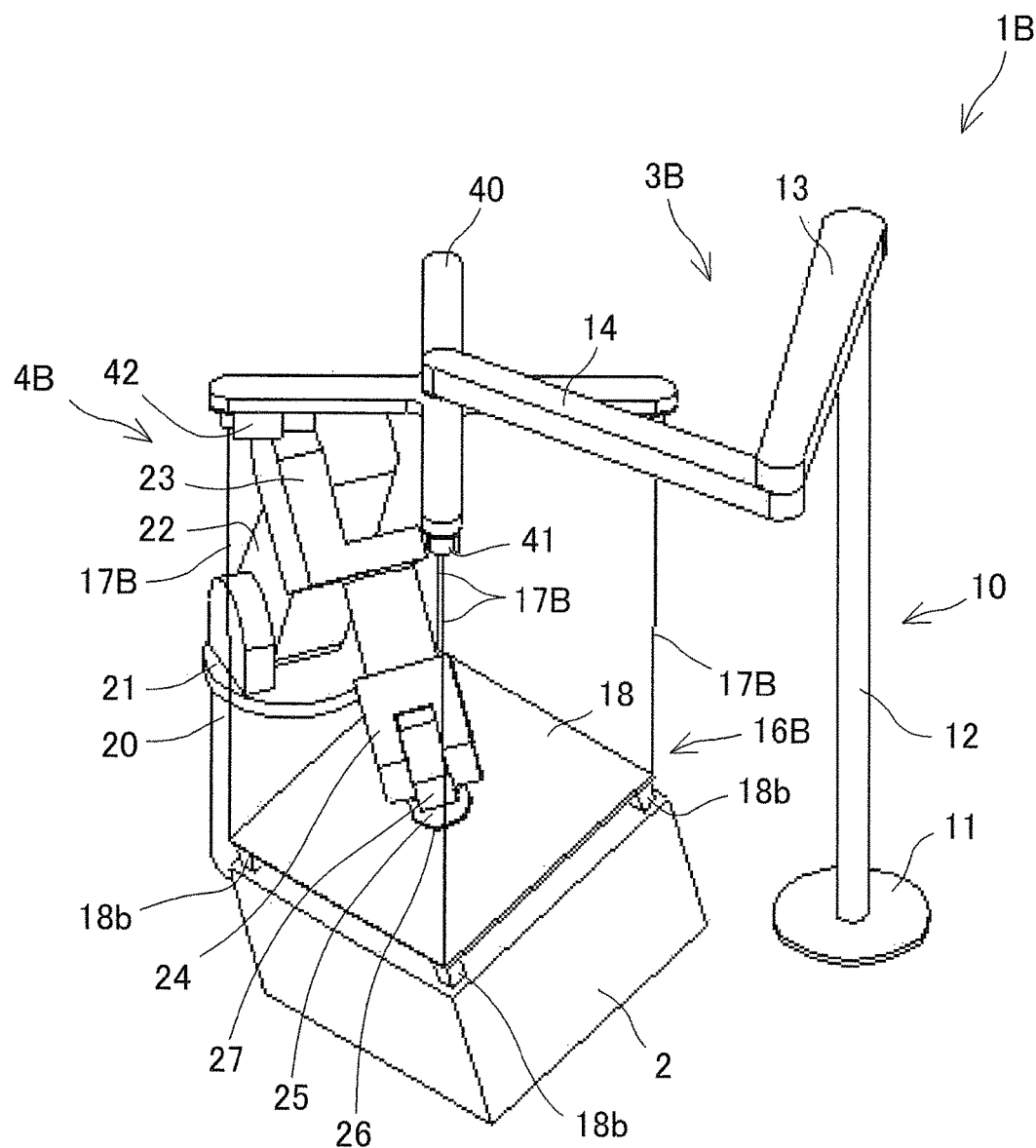
FIG. 10 is a perspective view showing a state where the heavy workpiece is being inclined by the conveyance system of FIG. 8.
Figure 11:
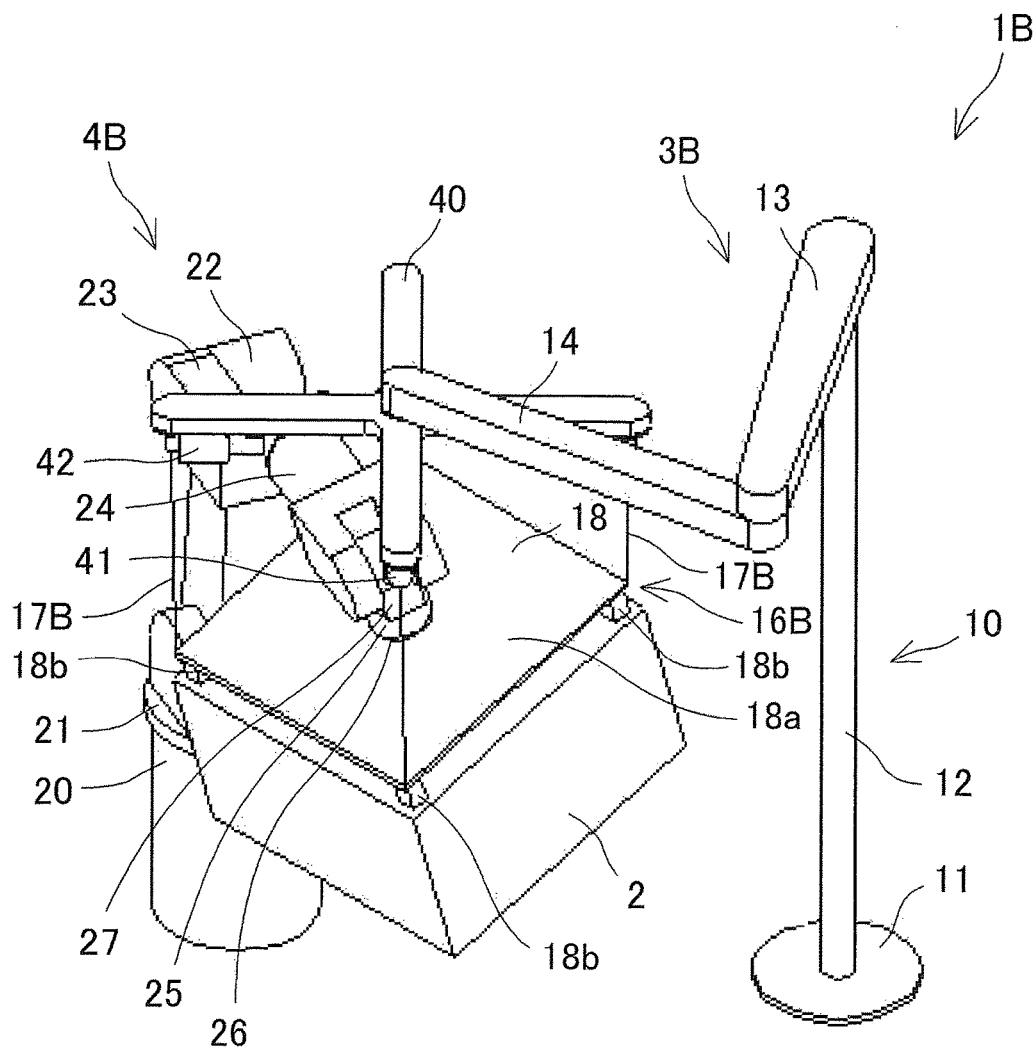
FIG. 11 is a perspective view showing a state where the inclined heavy workpiece is lifted up by the conveyance system of FIG. 8.

In the lifting operation step (Step S5), the suspension controller 6B controls the operations of the lifting mechanisms 41 to 44 in accordance with the program or the control command. Thus, the posture of the workpiece 2 is changed while the workpiece 2 is being lifted up. Specifically, the suspension controller 6B individually controls the rotating speeds (i.e., winding speeds of the winding drums 15c) of the servo motors 15a of the lifting mechanisms 41 to 44. Thus, suspending lengths of the suspending wires 17B are adjusted. Here, the suspending length is a length of a portion hanging down from the winding drum 15c (i.e., a length of an unwound portion). In the present embodiment, the winding speeds of the lifting mechanisms 41 to 44 are set such that the winding speed is faster in order of the third lifting mechanism 43, the fourth lifting mechanism 44, the second lifting mechanism 42, and the first lifting mechanism 41. As shown in FIG. 10, the suspending lengths of the suspending wires 17B are adjusted such that the workpiece 2 is inclined toward a near side on the sheet of FIG. 10. When the posture of the workpiece 2 becomes a predetermined posture, the suspension controller 6B controls the operations of the lifting mechanisms 41 to 44 such that the winding speeds become equal to one another. Thus, as shown in FIG. 11, the workpiece 2 is lifted up to a predetermined height while maintaining the predetermined posture. A method of changing the posture of the workpiece 2 may be a method of equalizing the winding speeds but changing winding times, instead of the above method of changing the winding speeds of the lifting mechanisms 41 to 44.

Figure 12:
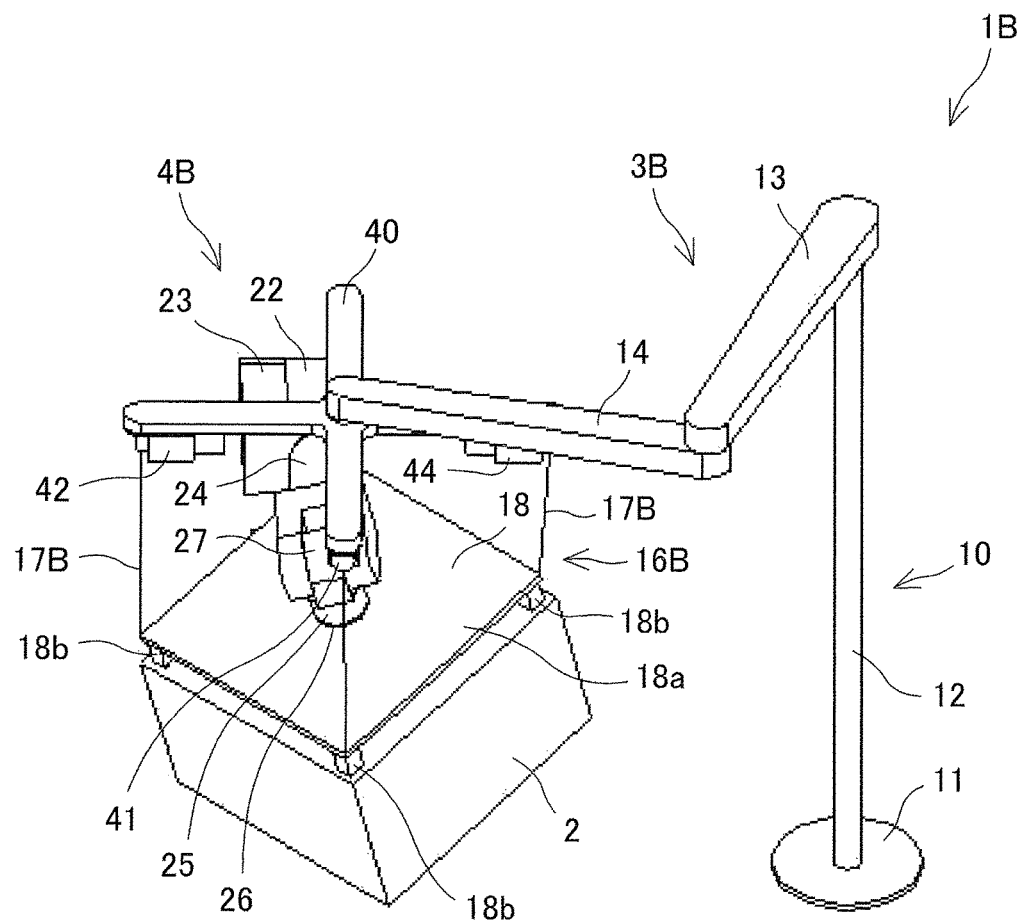
FIG. 12 is a perspective view showing a state where the inclined heavy workpiece has been conveyed to the predetermined position by the conveyance system of FIG. 8.

Concurrently with the above posture changing operation, in the conveyance operation step (Step S4), the conveyance controller 5 controls the operation of the robot 4 based on the program or the control command. Thus, the posture of the holding part 26 is changed in accordance with the posture of the workpiece 2. With this, while the posture of the workpiece 2 is being changed and after the posture of the workpiece 2 is changed, the robot 4 can hold the suspended workpiece 2 through the attaching mechanism 18. When the conveyance controller 5 controls the operation of the robot 4 to move the holding part 26, the workpiece 2 can be moved to the conveyance termination position while maintaining the changed posture of the workpiece 2 as shown in FIG. 12.

As above, the conveyance system 1B of the present embodiment can convey the workpiece 2 in a state where the posture of the workpiece 2 is changed. Therefore, the workpiece 2 can be perpendicularly placed on a portion whose attachment surface or placement surface is not horizontal. Thus, the surface can be prevented from being damaged by the contact of a corner of the workpiece 2 with the surface or the action of a local stress on the surface. The conveyance system 1B can maintain the posture of the workpiece 2 with highly accurate balance by controlling an angular displacement amount of an output shaft of the servo motor 15a of the lifting unit 15 or the output shaft of the servo motor 15a with a high degree of accuracy.

Other than the above, the conveyance system 1B of Embodiment 3 has the same operational advantages as the conveyance system 1 of Embodiment 1.

Embodiment 4

Figure 13:
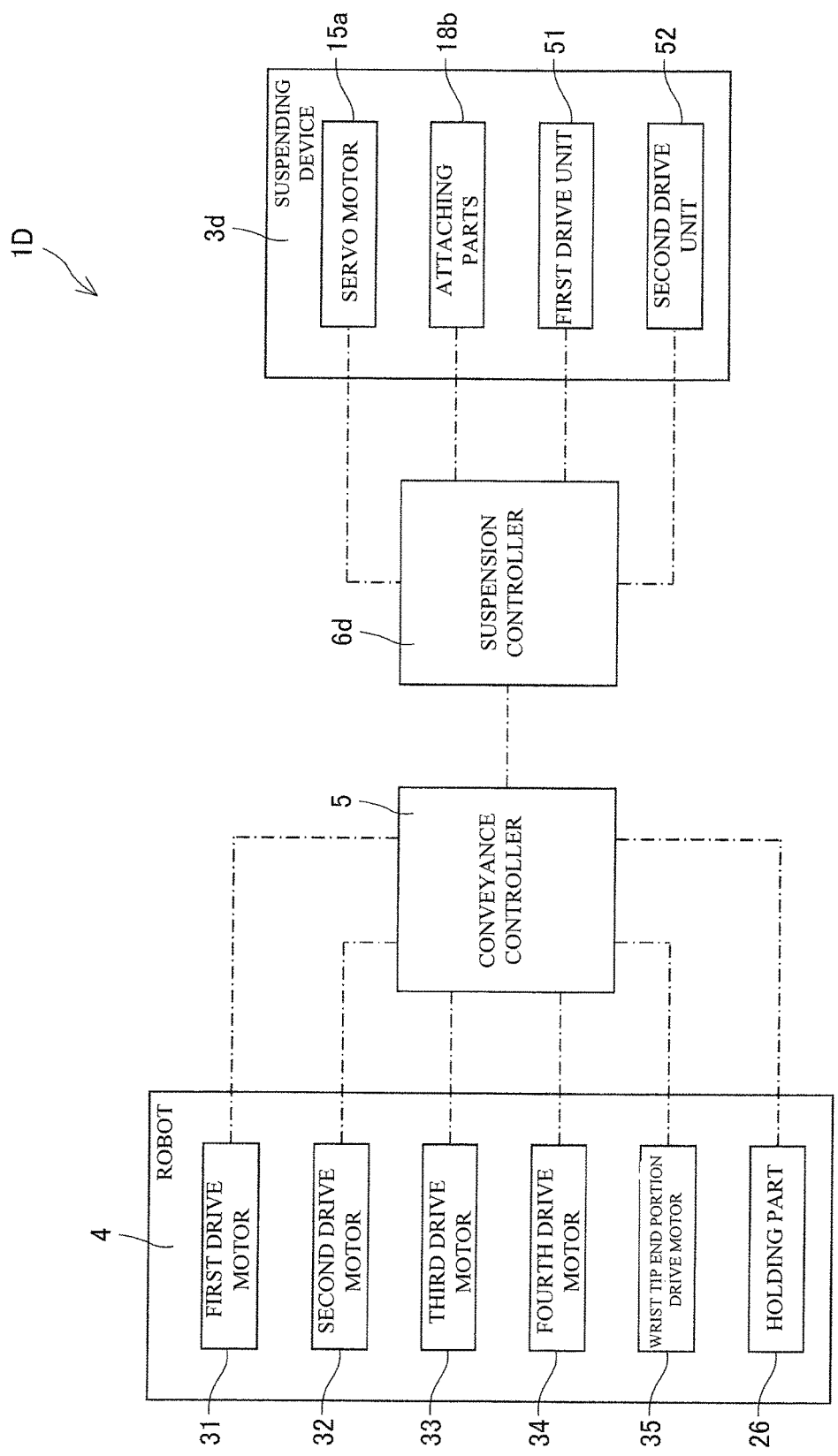
FIG. 13 is a block diagram showing the electric configuration of Embodiment 4 of the present invention.

A conveyance system 1C of Embodiment 4 includes a suspending device 3C and the robot 4. The suspending device 3C includes a support mechanism 10C, and the support mechanism 10C includes two drive units 51 and 52 as shown in FIG. 13. Each of the first drive unit 51 and the second drive unit 52 that are drive units includes a servo motor and a reducer (both not shown). The first drive unit 51 and the second drive unit 52 respectively cause the base end arm 13 and the tip end arm 14 to rotate. These two drive units 51 and 52 are electrically connected to the suspension controller 6C, and the suspension controller 6C individually controls the drive units 51 and 52 based on the program or the control command.

In the conveyance system 1C configured as above, in a case where the operation of the suspending device 3C is caused to follow the operation of the robot 4 as in the first conveyance method, the conveyance controller 5 generates a control command for synchronizing the operation of the attaching mechanism 18 with all-direction operations of the holding part 26 including not only the upper-lower operation but also forward-backward and leftward-rightward operations, and transmits the control command to the suspension controller 6C. In a case where the operation of the robot 4 is caused to follow the operation of the suspending device 3C as in the second conveyance method, the suspension controller 6C generates a control command for synchronizing the operation of the holding part 26 with all-direction operations of the attaching mechanism 18 including not only the upper-lower operation but also forward-backward and leftward-rightward operations, and transmits the control command to the conveyance controller 5.

By the transmission and reception of the control command between the conveyance controller 5 and the suspension controller 6C, the above-described first to third conveyance methods can be executed. In addition, in the conveyance system 1C, the arms 13 and 14 can be rotated by the drive units 51 and 52. Therefore, the conveyance operation by the robot 4 can be assisted by the suspending device 3C. Thus, the robot 4 can move the workpiece 2 in the horizontal direction with a lower output.

Other than the above, the conveyance system 1C of Embodiment 4 has the same operational advantages as the conveyance system 1 of Embodiment 1.

Embodiment 5

Figure 14A:
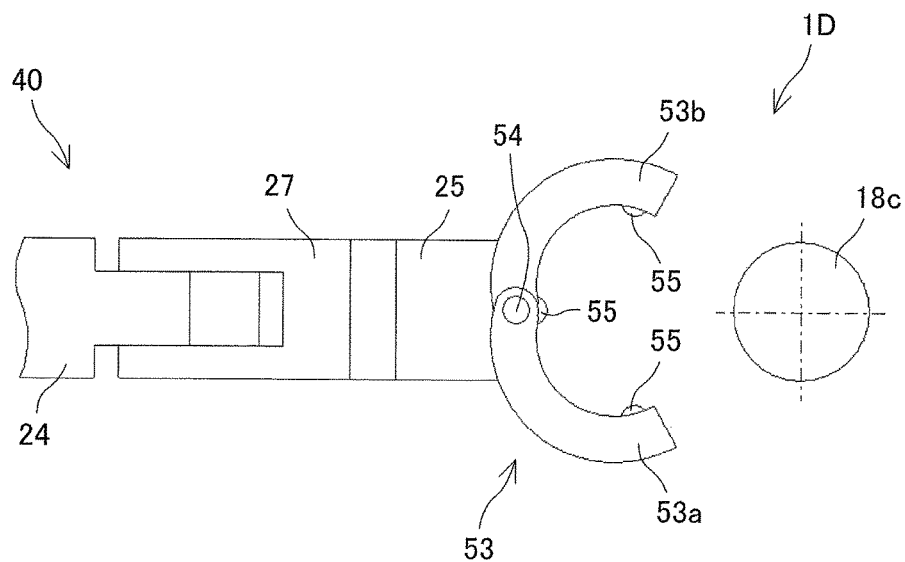
FIG. 14A is a diagram showing a hand and holding part included in the conveyance system of Embodiment 5 of the present invention and is a plan view showing the hand and the holding part.
Figure 14B:
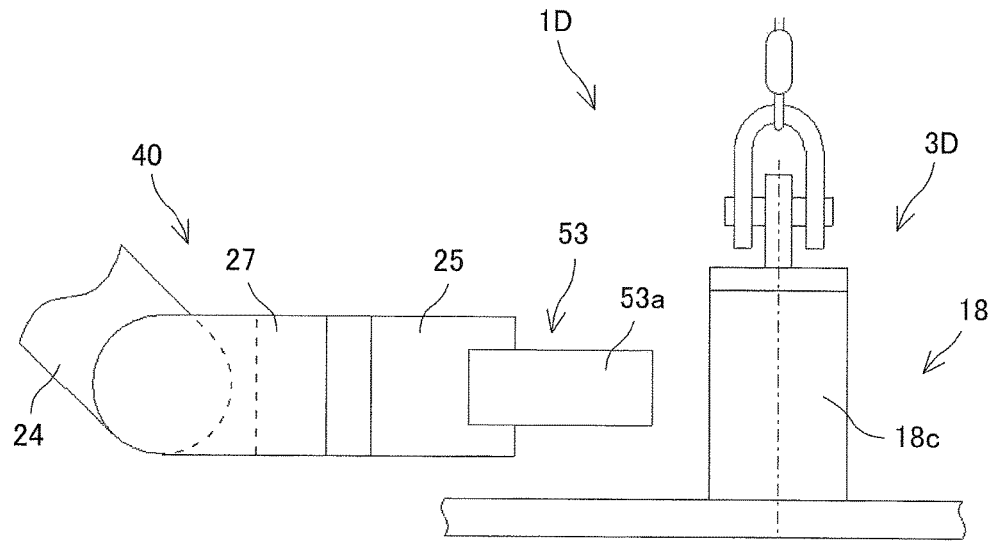
FIG. 14B is a diagram showing the hand and holding part included in the conveyance system of Embodiment 5 of the present invention and is a side view showing the hand and the holding part.

A conveyance system 1D of Embodiment 5 includes a suspending device 3D and a robot 4D. The suspending device 3D includes an attaching mechanism 18D, and the attaching mechanism 18D includes the main body 18a, the attaching parts 18b, and a holding part 18c. As shown in FIGS. 14A and 14B, the holding part 18c is a substantially columnar member and is provided at an upper surface of the main body 18a. More specifically, the holding part 18c is provided at a center position of the upper surface of the main body 18a and extends upward from the upper surface.

Figure 15A:
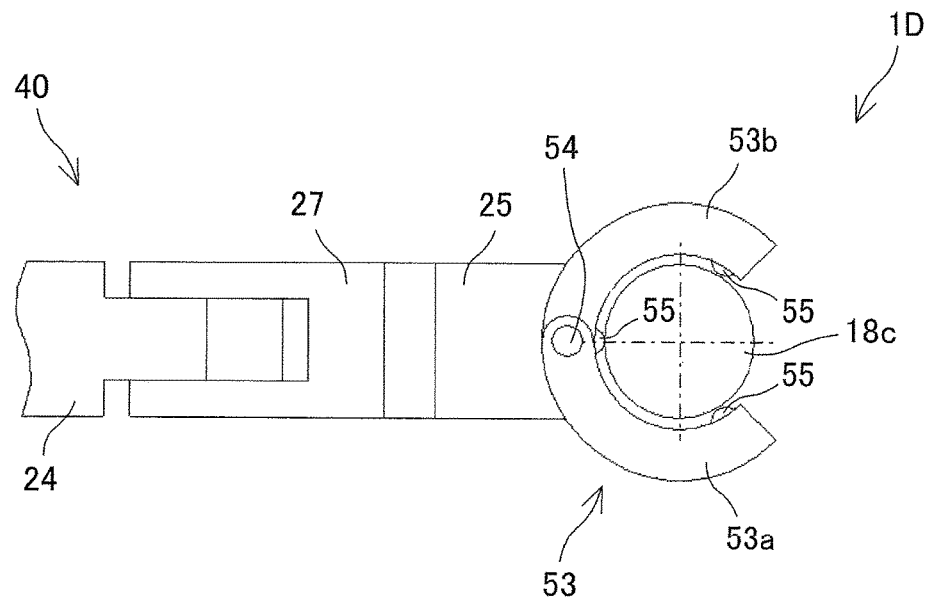
FIG. 15A is a diagram showing a state where the holding part is held by the hand of FIG. 14A and is a plan view showing the hand and the holding part.
Figure 15B:
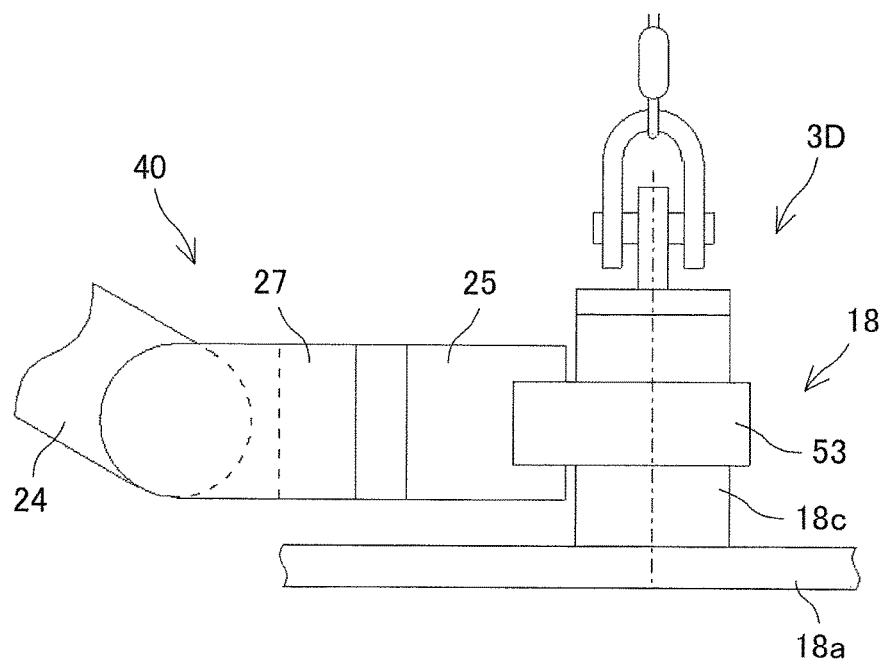
FIG. 15B is a diagram showing a state where the holding part is held by the hand of FIG. 14B and is a side view showing the hand and the holding part.

As shown in FIGS. 14A and 14B, a hand 53 is provided at a tip end portion of the wrist tip end portion 25 of the robot 4D. The hand 53 that is a guide part is formed in a substantially U shape and includes two finger portions 53a and 53b. Each of these two finger portions 53a and 53b is formed in a substantially circular-arc shape, and one circumferential end portion of the finger portion 53a and one circumferential end portion of the finger portion 53b are coupled to each other by a swing pin 54 so as to be swingable relative to each other. The hand 53 configured as above can open or close in such a manner that the other end portion of the finger portion 53a and the other end portion of the finger portion 53b get close to each other or are separated from each other by swinging the finger portions 53a and 53b. By opening the hand 53, the holding part 18c can get in the hand 53, and by closing the hand 53 as shown in FIGS. 15A and 15B, the hand 53 can hold a side surface of the holding part 18c located in the hand 53.

Three roller balls 55 are provided at regular intervals at an inner peripheral surface portion of the hand 53 that is openable and closable as above. A part of each of the roller balls 55 projects from the inner peripheral surface portion of the hand 53. The roller balls 55 are provided at the inner peripheral surface portion of the hand 53 so as to rotate. The roller balls 55 allow the holding part 18c, held by the hand 53, to rotate around its axis and move in its axial direction.

As with the holding part 26 of the conveyance system 1 of Embodiment 1, the hand 53 configured as above is used to hold the workpiece 2 through the attaching mechanism 18. Therefore, the robot 4D can guide and move the workpiece 2 in the horizontal direction by holding the attaching mechanism 18D by the hand 53 and applying a horizontal acting force to the holding part 18c by the hand 53. On the other hand, the hand 53 allows the axial movement of the holding part 18c. Therefore, in a case where the holding part 18c extends in the upper-lower direction, the hand 53 can fend the upper-lower interfering force applied from the holding part 18c. Thus, the applied load on the robot 4D due to the interfering force can be eliminated.

In the conveyance system 1D configured as above, the axial movement of the attaching mechanism 18D relative to the hand 53 is allowed. Therefore, the applied load on the robot 4D can be reduced without synchronizing the lifting operation of the lifting unit 15 with the upper-lower operation of the hand 53. On this account, the lifting operation of the lifting unit 15 can be performed after the upper-lower operation of the hand 53 is started. Thus, the synchronization control operation becomes unnecessary, and the control of the operation of the robot 4D and the operation of the suspending device 3D by the conveyance controller 5 and the suspension controller 6 can be simplified.

The workpiece 2 can be conveyed by the same method as the first and second conveyance methods except that the hand 53 holds the holding part 18c of the attaching mechanism 18D to guide the workpiece 2. The conveyance system 1D of Embodiment 5 has the same operational advantages as the conveyance system 1 of Embodiment 1.

Other Embodiments

In each of the conveyance systems 1 and 1A to 1D of Embodiments 1 to 5, the conveyance controller 5 executes the compliance control operation with respect to the robot 4, 4B, or 4D. However, the compliance control operation is not necessarily required to be executed. The same operational advantages as the compliance control operation may be obtained by a physical structure, that is, by providing a buffer member, such as a soft absorber, at any of the arms 21 to 24 and the wrist tip end portion 25 of the robot 4, 4B, or 4D. Further, each of the suspending mechanisms 16 and 16B of the suspending devices 3 and 3A to 3D is not necessarily required to be constituted by the suspending wire 17 or 17B and may be constituted by an air cylinder, an oil-pressure cylinder, or a ball screw. Each of the suspending mechanisms 16 and 16B may be anything as long as it can expand and contract in the upper-lower direction or it can lift up and down the attaching mechanism 18.

In each of the conveyance systems 1 and 1A to 1D of Embodiments 1 to 5, the holding part 26 or the hand 53 conveys the workpiece 2 through the attaching mechanism 18 or 18D. However, the holding part 26 or the hand 53 may directly convey the workpiece 2. In addition, each of the robots 4, 4B, and 4D is constituted by a vertical articulated robot but may be constituted by a horizontal three-axis robot, and the type of the robot is not limited.

Further, in each of the conveyance systems 1 and 1A to 1D of Embodiments 1 to 5, the lifting unit 15 is provided at the tip end arm 14. However, the lifting unit 15 may be provided at the post member 12. In this case, the main body portion 17a of the suspending wire 17 winding around the winding drum 15c is provided so as to extend along two arms and hang down from the tip end portion of the tip end arm 14.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

REFERENCE SIGNS LIST 1, 1A to 1D conveyance system
2 workpiece
3, 3A to 3D suspending device
4, 4B, 4D robot
5 conveyance controller
6, 6A to 6C suspension controller
10 support mechanism
15 lifting unit
16 suspending mechanism
17B suspending wire
18 attaching mechanism
18c holding part
18D attaching mechanism
19 torque sensor
26 holding part
41 first lifting unit
42 second lifting unit
43 third lifting unit
44 fourth lifting unit
51 first drive unit
52 second drive unit
53 hand
55 roller ball

The invention claimed is:

1. A conveyance system comprising:
a conveyance robot configured to move and convey a workpiece in a horizontal direction;
a suspending device including
a suspending mechanism configured to suspend the workpiece,
a lifting unit configured to lift up and down the workpiece suspended by the suspending mechanism, and
a support mechanism configured to support the suspending mechanism such that the suspending mechanism is movable in the horizontal direction;
a first controller configured to control a lifting operation of the workpiece by the lifting unit of the suspending device; and
a second controller configured to control a conveyance operation of the workpiece by the conveyance robot, wherein:
the suspending mechanism includes
a suspending wire including a plurality of lower end portions, and
an attaching mechanism coupled to the plurality of lower end portions and including a plate-shaped main body and an attaching part, the attaching part being fixed to a lower surface of the main body and attached to the workpiece from above;
the conveyance robot includes
a guide part configured to guide the workpiece, and
a robot main body configured to move the guide part, the guide part being attracted to an upper surface of the main body of the attaching mechanism;
the robot main body moves the guide part in the horizontal direction and an upper-lower direction to convey the workpiece;
the first controller and the second controller cause the lifting operation of the workpiece by the lifting unit and the upper-lower movement operation of the guide part by the conveyance robot to be synchronized with each other;

the first controller controls the lifting operation of the lifting unit based on a control command transmitted from the second controller; and the second controller executes with respect to the robot main body a compliance control operation in which compliance with respect to an upper-lower movement of the guide part is set to be low, and compliance with respect to a horizontal movement of the guide part is set to be high.

2. The conveyance system according to claim 1, wherein the first controller executes the lifting operation of the workpiece by the lifting unit in synchronization with the upper-lower movement operation of the guide part by the conveyance robot.

3. The conveyance system according to claim 1, wherein the second controller executes the upper-lower movement operation of the guide part by the conveyance robot in synchronization with the lifting operation of the workpiece by the lifting unit.

4. The conveyance system according to claim 1, further comprising:
a weight detector configured to detect a weight of the suspended workpiece, wherein
the first controller stores a static weight of the suspended workpiece and controls the lifting operation of the workpiece such that the weight detected by the weight detector while the workpiece is conveyed becomes equal to the stored static weight.

5. The conveyance system according to claim 1, wherein:
the suspending mechanism includes
an attaching portion to which the workpiece is attached, and
a plurality of suspending portions configured to suspend the attaching portion at different positions;
the lifting unit includes a plurality of lifting mechanisms respectively provided for the suspending portions and configured to respectively change suspending lengths of the suspending portions; and
the first controller individually drives the lifting mechanisms.

6. The conveyance system according to claim 1, wherein:
the support mechanism includes a drive unit configured to move the suspending mechanism in the horizontal direction; and
when the conveyance robot moves the guide part in the horizontal direction, the first controller drives the drive unit in synchronization with the horizontal movement of the guide part.

7. The conveyance system according to claim 1, wherein the guide part guides and conveys the workpiece in the horizontal direction while allowing a relative upper-lower movement of the workpiece relative to the guide part.

8. A conveyance method of a conveyance system,
the conveyance system comprising:
a conveyance robot configured to move and convey a workpiece in a horizontal direction;
a suspending device including a suspending mechanism configured to suspend the workpiece,
a lifting unit configured to lift up and down the workpiece suspended by the suspending mechanism, and
a support mechanism configured to support the suspending mechanism such that the suspending mechanism is movable in the horizontal direction;
a first controller configured to control a lifting operation of the workpiece by the lifting unit of the suspending device; and
a second controller configured to control a conveyance operation of the workpiece by the conveyance robot, wherein
the suspending mechanism includes
a suspending wire including a plurality of lower end portions, and
an attaching mechanism coupled to the plurality of lower end portions and including a plate-shaped main body, and an attaching part, the attaching part being fixed to a lower surface of the main body and configured to hold the workpiece from above;
the conveyance robot includes
a guide part configured to guide the workpiece, and
a robot main body configured to move the guide part, the guide part being attracted to an upper surface of the main body of the attaching mechanism; and
the robot main body moves the guide part in the horizontal direction and an upper-lower direction to convey the workpiece,
the conveyance method comprising:
a conveying step of controlling the operation of the conveyance robot by the second controller to convey the workpiece by the conveyance robot; and
a lifting step of controlling the operation of the lifting unit by the first controller to lift up and down the workpiece by the lifting unit, wherein:
the first controller and the second controller cause the upper-lower movement operation of the guide part in the conveying step and the lifting operation of the workpiece in the lifting step to be synchronized with each other;
the first controller executes the lifting step based on a control command transmitted from the second controller; and
in the conveying step, the second controller executes with respect to the robot main body a compliance control operation in which compliance with respect to an upper-lower movement of the guide part is set to be low, and compliance with respect to a horizontal movement of the guide part is set to be high.

9. The conveyance method according to claim 8, wherein the upper-lower movement operation of the guide part by the conveyance robot in the conveying step is executed in synchronization with the lifting operation of the workpiece by the lifting unit in the lifting step.

10. The conveyance method according to claim 8, wherein in the lifting step, a static weight of the suspended workpiece is stored, and the workpiece is lifted up and down such that the weight detected while the workpiece is conveyed becomes equal to the stored static weight.

* * * * *